United States Patent
Chavva et al.

(10) Patent No.: US 11,438,821 B2
(45) Date of Patent: Sep. 6, 2022

(54) METHOD AND SYSTEM FOR HANDLING BEAM BLOCKAGE IN WIRELESS COMMUNICATION SYSTEM

(71) Applicant: Samsung Electronics Co., Ltd., Gyeonggi-do (KR)

(72) Inventors: Ashok Kumar Reddy Chavva, Bangalore (IN); Anusha Gunturu, Bangalore (IN); Shouvik Guha, Bangalore (IN)

(73) Assignee: Samsung Electronics Co., Ltd

( * ) Notice: Subject to any disclaimer, the term of this patent is extended or adjusted under 35 U.S.C. 154(b) by 215 days.

(21) Appl. No.: 16/507,973

(22) Filed: Jul. 10, 2019

(65) Prior Publication Data

US 2020/0137657 A1 Apr. 30, 2020

(51) Int. Cl.
*H04W 4/00* (2018.01)
*H04W 36/30* (2009.01)
*H04W 36/08* (2009.01)
*H04W 80/08* (2009.01)
*H04W 36/00* (2009.01)
*H04W 80/02* (2009.01)
(Continued)

(52) U.S. Cl.
CPC ........ *H04W 36/305* (2018.08); *H04B 17/336* (2015.01); *H04W 24/10* (2013.01); *H04W 36/0058* (2018.08); *H04W 36/00837* (2018.08); *H04W 36/08* (2013.01); *H04W 74/0833* (2013.01); *H04W 80/02* (2013.01); *H04W 80/08* (2013.01)

(58) Field of Classification Search
CPC .................................................. H04W 36/305
See application file for complete search history.

(56) References Cited

U.S. PATENT DOCUMENTS

| | | | |
|---|---|---|---|
| 11,252,586 B2 * | 2/2022 | Kwon | H04W 24/08 |
| 2013/0188619 A1 * | 7/2013 | Dinan | H04W 72/042 370/336 |

(Continued)

FOREIGN PATENT DOCUMENTS

| | | |
|---|---|---|
| WO | WO 2017/014802 | 1/2017 |
| WO | WO 2017/196362 | 11/2017 |

(Continued)

OTHER PUBLICATIONS

3GPP TR 38.901 V14.3.0, "Study on channel model for frequencies from 0.5 to 100 GHz", Dec. 2017, pp. 1-91.

(Continued)

*Primary Examiner* — Guang W Li
(74) *Attorney, Agent, or Firm* — The Farrell Law Firm, P.C.

(57) ABSTRACT

A method for handling beam blockage in a wireless communication system by a user equipment (UE), a method for handling beam blockage in a wireless communication system by a base station, a UE, and a base station are provided. The method for handling beam blockage in a wireless communication system by a UE includes detecting, by a user equipment (UE), a blockage of at least one beam; determining, by the UE, a duration of the blockage of the at least one beam, wherein the duration of the blockage is determined at a time period at which the blockage is detected; and indicating, by the UE, the blockage.

16 Claims, 20 Drawing Sheets

(51) Int. Cl.
*H04W 74/08* (2009.01)
*H04B 17/336* (2015.01)
*H04W 24/10* (2009.01)

(56) References Cited

U.S. PATENT DOCUMENTS

| | | | |
|---|---|---|---|
| 2017/0331670 A1 | 11/2017 | Parkvall et al. | |
| 2018/0139742 A1 | 5/2018 | Sun et al. | |
| 2018/0212694 A1* | 7/2018 | Jheng | H04W 36/08 |
| 2018/0279287 A1 | 9/2018 | Wilson et al. | |
| 2019/0053293 A1* | 2/2019 | Akoum | H04W 24/10 |
| 2019/0261344 A1* | 8/2019 | Grant | H04B 7/0617 |
| 2020/0037332 A1* | 1/2020 | da Silva | H04W 72/085 |
| 2020/0177263 A1* | 6/2020 | Zhang | H04W 74/0833 |
| 2020/0374960 A1* | 11/2020 | Deenoo | H04W 72/14 |
| 2020/0403689 A1* | 12/2020 | Rofougaran | H04B 7/165 |
| 2021/0068157 A1* | 3/2021 | Auslender | H04W 74/0833 |
| 2021/0105176 A1* | 4/2021 | Tsai | H04B 7/0695 |
| 2021/0194756 A1* | 6/2021 | Babaei | H04W 74/0808 |
| 2021/0234601 A1* | 7/2021 | Awadin | H04L 5/0048 |

FOREIGN PATENT DOCUMENTS

| | | | | |
|---|---|---|---|---|
| WO | WO 2018/064483 | | 4/2018 | |
| WO | WO-2018064483 A1 * | | 4/2018 | H04W 76/00 |
| WO | WO-2019154524 A1 * | | 8/2019 | H04B 17/309 |

OTHER PUBLICATIONS

3GPP TS 38.331 V15.3.0, "Radio Resource Control(RRC) protocol specification", Sep. 2018, pp. 1-445.
3GPP TS 38.321 V15.4.0, "Medium Access Control (MAC) protocol specification", Dec. 2018, pp. 1-77.
Nokia, Alcatel-Lucent Shanghai Bell, "Beam Recovery in NR", R2-1701681, 3GPP TSG-RAN WG2 Meeting #97, Feb. 13-17, 2017, 5 pages.
AT&T, Beam Failure Recovery Mechanism and RLF, R2-1706680, 3GPP TSG-RAN WG2 NR-Adhoc, Jun. 27-29, 2017, 8 pages.
International Search Report dated Nov. 21, 2019 issued in counterpart application No. PCT/KR2019/010305, 10 pages.
Zte, "Radio Link Monitoring in NR", R1-1709900, 3GPP TSG RAN WG1 NR Ad-Hoc#2, Jun. 27-30, 2017, 6 pages.
Vivo, "On Beam Failure Recovery Procedure", R1-1712839, 3GPP TSG RAN WG1 Meeting #90, Aug. 21-25, 2017, 5 pages.
Zte, "Consideration on the RLF and Beam Failure in NR", R2-1706675, 3GPP TSG RAN WG2#NR_AdHoc#2, Jun. 27-29, 2017, 5 pages.
European Search Report dated Aug. 24, 2021 issued in counterpart application No. 19876896.2-1212, 13 pages.
Indian Examination Report dated Dec. 4, 2020 issued in counterpart application No. 201841040515, 6 pages.

* cited by examiner

METHOD AND SYSTEM FOR HANDLING BEAM BLOCKAGE IN WIRELESS COMMUNICATION SYSTEM

CROSS-REFERENCE TO RELATED APPLICATION(S)

This application is based on claims priority under 35 U.S.C. § 119 to Indian Patent Application No. 201841040515, filed on Oct. 26, 2018, in the Indian Intellectual Property Office, the disclosure of which is incorporated by reference herein in its entirety.

BACKGROUND

1. Field

The present disclosure relates generally to a wireless communication system and, more particularly, to a method and system for handling beam blockage in a wireless communication system.

2. Description of the Related Art

Generally, mobile communication systems have been developed for providing a high quality mobile communication service to a user. In order to meet the demand for increased wireless data traffic, since deployment of $4^{th}$ generation (4G) communication systems, efforts have been made to develop an improved $5^{th}$ generation (5G) communication systems or a long term evolution advanced (LTE-Advanced) communication system. Therefore, the 5G or pre-5G communication system is also called a "beyond 4G network" or a "post LTE system."

The 5G communication system is considered to be implemented in a millimeter wave (mm wave) or in extremely higher frequency bands as well, for example, 28 GHz, 60 GHz, etc., so as to accomplish higher data rates. To decrease propagation loss of radio waves and increase transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM), frequency QAM (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As the 5G communication system operates in the millimeter waves, there may be a sudden blockage from buildings, vehicles, human movement, or other conditions during transmission. Hence, a wireless device (e.g., a user equipment (UE)) may not receive a signal from a base station (BS) due to the blockage.

FIG. 1 is an illustration of a vehicular blockage, according to the prior art. "R" is a receiver entity is a low power mobile device whose service area is defined by region (ABCD), "T" is a transmit entity. A service is blocked whenever there is a blocker moving in "ABCD." In addition, a blockage duration will vary depending on the receiver and blocker characteristics. A new radio (NR) system such as a 5G communication system, is likely to provide a low latency service or a high data rate service. In NR unlike in LTE even a small duration of blockage might lead to a major loss in quality of service. Further, there is significant attenuation of around 10-20 dB detected due to blockage. However, there is no existing method for proper handling of temporary beam blockages.

The 3rd generation partnership project (3GPP) adopted a geometric method for capturing a human blockage and a vehicular blockage in a wireless communication system. FIG. 2 is a graph illustrating an effect of a beam blockage, according to the prior art. Referring to FIG. 2, when the blockage is detected, there is a drop in signal strength for a blockage duration (d). During the blockage duration d, the UE may report and perform a retransmission of a packet. Typically, the minimum blockage duration for a human is 2700 ms and for a vehicle is 172 ms observed under a test condition as shown in FIG. 2. Further, when the blockage effect is not compensated, the blockage may induce latency in the wireless communication system.

Thus, it is desired to address the above mentioned disadvantages or other shortcomings or at least provide a useful alternative.

SUMMARY

An aspect of the present disclosure provides a method and a system for handling beam blockage in a wireless communication system.

In accordance with an aspect of the present disclosure, a method for handling beam blockage in a wireless communication system is provided. The method includes detecting, by a UE, a blockage of at least one beam, determining, by the UE, a duration of the blockage of the at least one beam, where the duration of the blockage is determined at a time period at which the blockage is detected, and indicating, by the UE, the blockage.

In accordance with another aspect of the present disclosure, a method for handling beam blockage in a wireless communication system is provided. The method includes detecting, by a BS, a blockage of at least one beam, determining, by the BS, a duration of the blockage of the at least one beam, wherein the duration of the blockage is determined at a time period at which the blockage is detected, and applying a beam switch or a link switch for the duration of the blockage.

In accordance with another aspect of the present disclosure, a UE for handling beam blockage in a wireless communication system is provided. The UE includes a memory, at least one processor, and a beam blockage controller, operably coupled to the memory and the at least one processor, configured to detect a blockage of at least one beam, determine a duration of the blockage of the at least one beam, wherein the duration of the blockage is determined at a time period at which the blockage is detected, and indicate the blockage.

In accordance with another aspect of the present disclosure, a base station for handling beam blockage in a wireless communication system is provided. The base station includes a memory, at least one processor, and a blockage controller, operably coupled to the memory and the at least one processor, configured to detect a blockage of at least one beam, determine a duration of the blockage of the at least one beam, wherein the duration of the blockage is determined at a time period at which the blockage is detected, and apply a beam switch or a link switch for the duration of the blockage.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
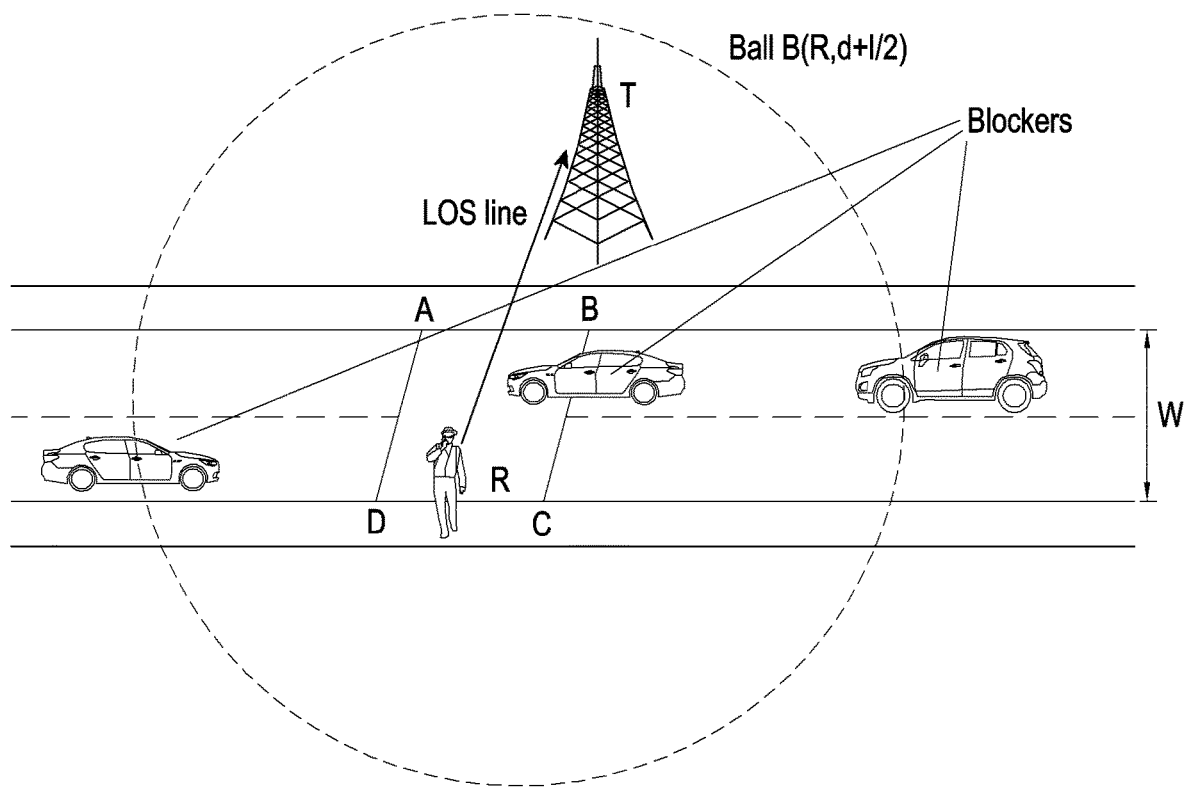
FIG. 1 is an illustration of vehicular blockage, according to the prior art.
Figure 2:
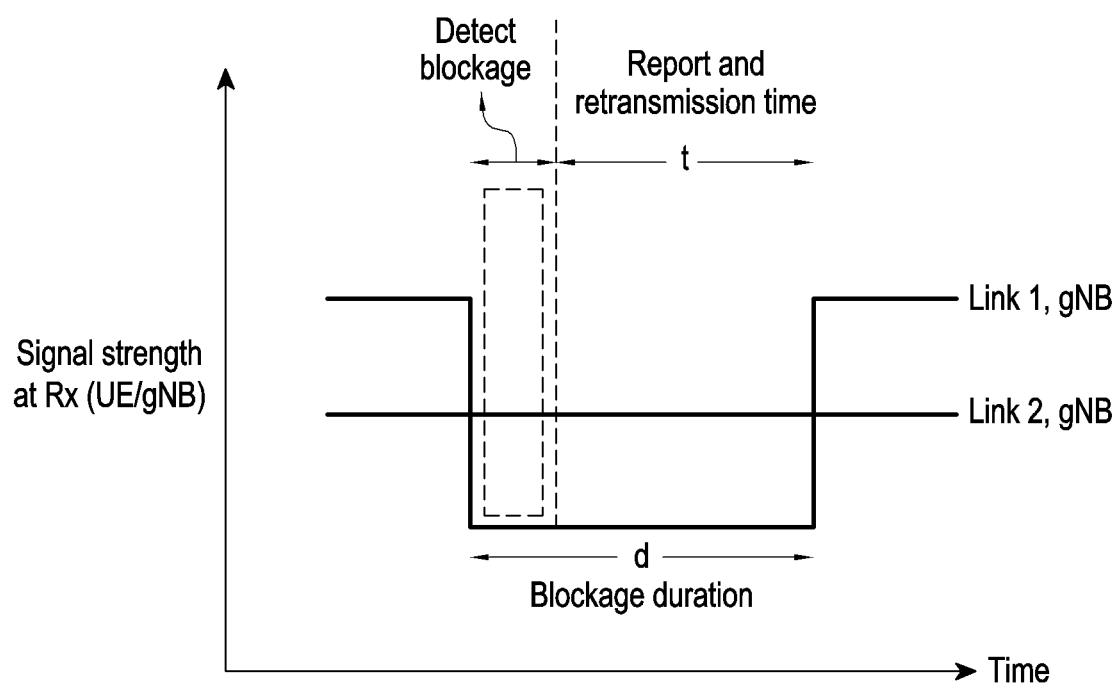
FIG. 2 is a graph of an effect of a beam blockage, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. In addition, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor integrated circuits or chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

Accordingly, the embodiments herein provide a UE for handling beam blockage in a wireless communication system. The UE includes a beam blockage controller, operably coupled to a memory and a processor. The beam blockage controller is configured to detect a blockage of at least one beam. Further, the beam blockage controller is configured to determine a duration of the blockage of the at least one beam at a physical layer, wherein the duration of the blockage is determined at a time period at which the blockage is detected. Further, the beam blockage controller is configured to indicate the blockage to at least one higher layer.

Unlike conventional methods and systems, a method of the present disclosure may be used to reduce a latency due to a blockage in a wireless communication system. The method determines a duration of the blockage of at least one beam and indicates the blockage to at least one higher layer to perform an action. For example, the method may be used to perform a beam switch/a link switch for the determined duration of the blockage. In this way, the method may be used to provide service continuity for users irrespective of the blockage.

Figure 3A:
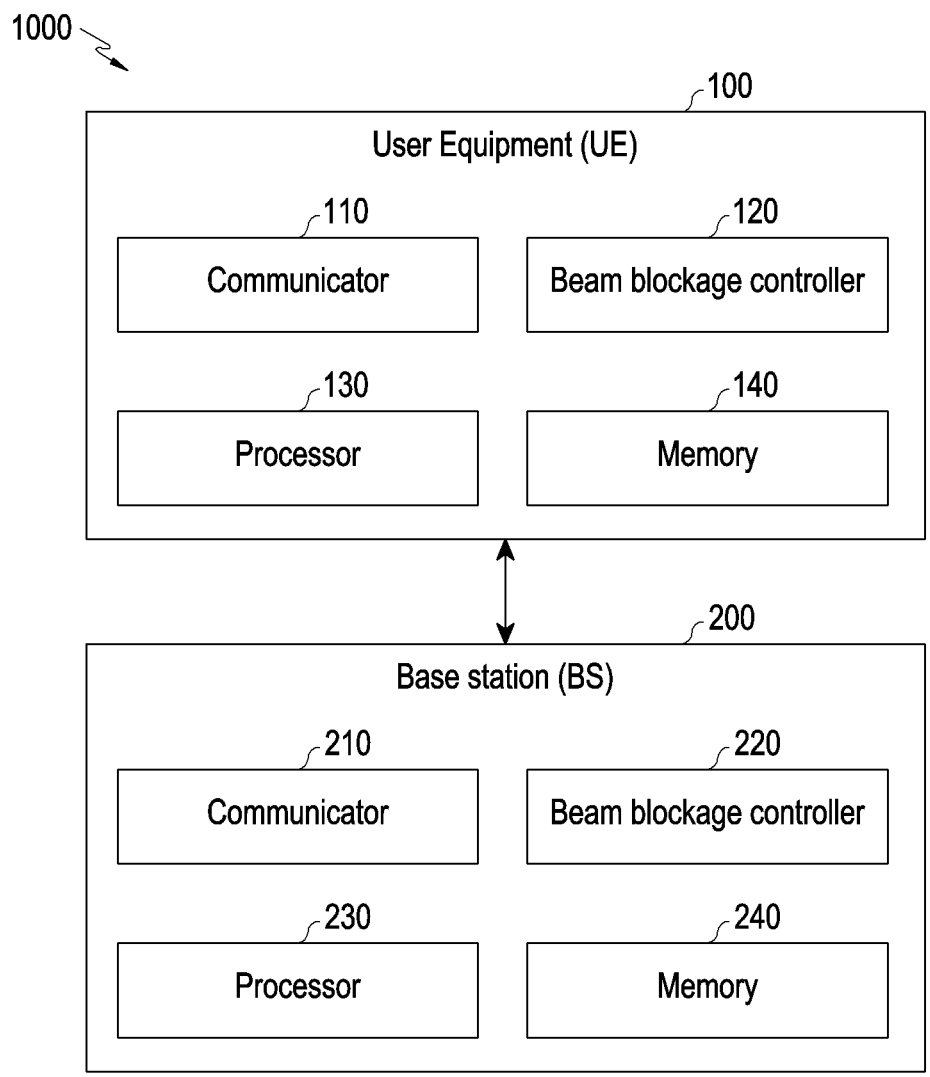
FIG. 3A is a block diagram of a wireless communication system in which a UE communicates with a BS for handling beam blockage, according to an embodiment of the present disclosure.

FIG. 3A is a block diagram of a wireless communication system 1000 in which a UE 100 communicates with a BS 200 for handling beam blockage, according to an embodiment of the present disclosure.

Referring to FIG. 3A, the wireless communication system 1000 includes the UE 100 and the BS 200 for handling the beam blockage. The UE 100 includes a communicator 110, a beam blockage controller 120, at least one processor 130 and a memory 140.

The UE 100 may include, for example, a cellular telephone, a smartphone, a personal computer (PC), a minicomputer, a desktop, a laptop, a handheld computer, personal digital assistant (PDA), or the like. The UE 100 may support multiple radio access technologies (RATs) such as, for example, code-division multiple access (CDMA), general packet radio service (GPRS), evolution-data optimized (EVDO), time-division multiple access (TDMA), global system for mobile communications (GMS), worldwide interoperability for microwave access (WiMAX) technology, LTE, LTE Advanced and 5G communication technologies.

The beam blockage controller 120 detects a blockage of at least one beam. The beam blockage controller 120 determines a reference signal received power (RSRP) of the at least one beam or a signal-to-interference-plus-noise ratio (SINR) of the at least one beam at a first time period. Further, the beam blockage controller 120 determines an RSRP of the at least one beam or a SINR of the at least one beam at a second time period. Further, the beam blockage controller 120 determines whether the difference meets a blockage criteria, where the blockage criteria is dynamically measured and configured by the UE 100. Further, the beam blockage controller 120 detects the blockage at the second time period due to the RSRP or the SINR of the at least one beam when the difference meets the blockage criteria.

The beam blockage controller 120 identifies a type of blockage based on:
a. Sudden drop in RSRP by 10-15 dB; and
b. Sudden drop in SINR by 5-10 dB.

Further, in an RSRP based technique, for a beam index i, if $RSRP_{N-1}$ is an observed RSRP at measurement period N−1 and $RSRP_N$ is an observed RSRP at measurement period N, then a blockage may be detected by the beam blockage controller 120, when there is a sudden drop in RSRP by 10-15 dB, as in Equation (1) as follows.

$$RSRP|_{N-1} - RSRP|_N < \Delta_{RSRP} \quad (1)$$

Further, in an SINR based technique, for a beam index i, where $SINR_{N-1}$ is an observed SINR at measurement period N−1 and $SINR_N$ is an observed SINR at measurement period N, then a blockage may be detected by the beam blockage controller 120 when there is a sudden drop in RSRP by 10-15 dB, as in Equation (2) as follows.

$$RSRP|_{N-1} - RSRP|_N < \Delta_{SINR} \quad (2)$$

where, $\Delta_{SINR}$: 5-10 dB.

The RSRP and SINR are pre-configured in the UE 100 based on simulation evaluations/field trials or may be measured by the UE 100 based on statistics.

The beam blockage controller 120 determines a duration of a blockage of at least one beam at a physical layer, where the duration of the blockage is determined at a time period at which the blockage is detected. The beam blockage controller 120 determines the duration of the blockage at the time period based on a median of historic blockage durations of the time period, where the duration of the blockage may be represented as $\tau_{Blockage}$.

For example, a duration of blockage at instance N is measured using statistics collected from previous blockage instances i=1, 2, . . . N−1. Further, a median of durations of blockages from N−1 previous instances is used as an estimate for blockage instance N, based on Equation (3) as follows.

$$\tau_{Blockage}|_N = \text{Median}(\tau_{Blockage}|_{i=1, \ldots, N-1}) \quad (3)$$

Statistics Measurement: For the sake of statistics, the UE 100 may continue measuring RSRP to keep track of the duration of blockage ($\tau_{blockage}$) and store in a buffer up to the latest N instances. The duration of blockage at any instance i$\tau_{Blockage,i}$ is the measurement evaluation period for which the RSRP/SINR suddenly reduces to a certain value.

The beam blockage controller 120 indicates a blockage to at least one higher layer.

The beam blockage controller 120 determines whether the UE 100 is in a connected mode or an idle mode. The UE 100 is in the idle mode, where there is no radio resource control (RRC) connection established. For the connected mode, the UE 100 must establish an RRC connection.

When the UE 100 is in an idle mode, the beam blockage controller 120 indicates a blockage to at least one higher layer to hold a cell reselection and then perform the cell reselection based on the duration of the blockage.

The beam blockage controller 120 determines whether all beams are blocked. Further, the beam blockage controller 120 determines whether the duration of the blockage meets a measurement evaluation criteria of a serving cell. Further, the beam blockage controller 120 determines whether the duration of the blockage meets the measurement evaluation criteria of the serving cell and a measurement evaluation criteria for a cell reselection. Furthermore, the beam blockage controller 120 holds the cell reselection and performs the cell reselection.

When the UE 100 is in the connected mode, the beam blockage controller 120 indicates a blockage to the at least one higher layer to hold at least one procedure and resume the at least one procedure based on the duration of the blockage or continue at least one procedure without incrementing a counter associated with the at least one procedure during the duration of the blockage. The at least one procedure may be, for example, but is not limited to, a transmission/reception procedure.

The beam blockage controller 120 determines whether a beam failure instance counter reaches a beam failure instance maximum count. The beam blockage controller 120 determines the Beam Failure Instance Counter based on a duration of a blockage and a measurement periodicity indicated by the physical layer. Further, the beam blockage controller 120 indicates the blockage to at least one higher layer to hold at least one procedure and resume the at least one procedure based on the duration of the blockage. The beam blockage controller 120 is configured to continue the at least one procedure without incrementing the counter associated with the at least one procedure during the duration of the blockage.

When the UE 100 is in the connected mode, the beam blockage controller 120 indicates a blockage to at least one higher layer to apply a beam switch or a link switch for the duration of the blockage.

The beam blockage controller 120 determines that a beam failure instance counter does not reach a beam failure instance maximum count. Further, the beam blockage controller 120 determines whether the duration of the blockage is less than a beam failure recovery timer. Further, the beam blockage controller 120 holds a beam failure recovery procedure and performs a link switch by rerouting a packet to another link for the duration of the blockage when the duration of the blockage is less than a time of the beam failure recovery timer. The beam blockage controller 120 triggers an early beam failure recovery procedure without waiting for expiry of the beam failure recovery timer and performs a beam switch or a link switch for the duration of the blockage when the duration of the blockage exceeds the time of the beam failure recovery timer.

The beam blockage controller 120 performs a beam switch or a link switch by performing a beam selection procedure to select at least one candidate beam from a plurality of candidate beams for an early beam failure recovery procedure. Further, the beam blockage controller 120 detects whether all the candidate beams are blocked. Further, the beam blockage controller 120 performs the link switch by rerouting a packet to another link for the duration of the blockage when all candidate beams are blocked. Further, the beam blockage controller 120 performs the beam switch by triggering a RACH procedure on the at least one selected candidate beam when at least one of the candidate beams is not blocked.

The beam blockage controller 120 is configured to hold and resume the at least one procedure based on the duration of the blockage, where the at least one procedure is held by stopping an ongoing RACH procedure for the duration of the blockage and the RACH procedure is resumed after an offset which is obtained based on the duration of the blockage.

The beam blockage controller 120 is configured to hold and resume at least one procedure based on a duration of the blockage, where the at least one procedure is held by stopping an ongoing SR procedure for the duration of the blockage and the SR procedure is resumed after an offset obtained based on the duration of the blockage.

The beam blockage controller 120 is configured to hold and resume at least one procedure based on the duration of the blockage, where the at least one procedure is held by stopping an ongoing transmit/retransmit (tx/retx) procedure for the duration of the blockage and the tx/retx procedure is resumed after the duration of the blockage.

The beam blockage controller 120 is configured to reroute a packet to another link for a duration of a blockage. The beam blockage controller 120 is configured to reroute the packet by indicating a packet data convergence protocol (PDCP) on the duration of the blockage based on a higher layer retransmission timer. Further, the beam blockage controller 120 is configured to select another link for re-routing the packet based on the duration of the blockage and the higher layer retransmission timer. The beam blockage controller 120 is configured to reroute the packet by indicating a PDCP on the duration of the blockage based on a PDCP t-Reordering timer. Further, the beam blockage controller 120 is configured to select another link for re-routing the packet based on the duration of the blockage and the PDCP t-Reordering timer.

The beam blockage controller 120 indicates a link indication to inform the BS 200 in the wireless communication system 1000 to not use the at least one beam for the duration of the blockage. The indication is one of a medium access control (MAC) control element (MAC-CE) based indication, a physical uplink control channel (PUCCH) based indication and a physical uplink shared channel (PUSCH) based indication.

The memory 140 may be configured to store instructions to be executed by the processor 130. The memory 140 may include non-volatile storage elements. Examples of such non-volatile storage elements may include magnetic hard discs, optical discs, floppy discs, flash memories, or forms of electrically programmable read only memories (EPROMs) or electrically erasable and programmable read only memories (EEPROMs). In addition, the memory 140 may, in some examples, be considered a non-transitory storage medium. The term "non-transitory" may indicate that the storage medium is not embodied in a carrier wave or a propagated signal. However, the term "non-transitory" is not intended to be interpreted that the memory 140 is non-movable. In some examples, the memory 140 may be configured to store large amounts of information. In certain examples, a non-transitory storage medium may store data that may, over time, change (e.g., in a random access memory (RAM) or a cache).

The BS 200 includes a communicator 210, a beam blockage controller 220, at least one processor 230 and a memory 240. The BS 200 may be, for example, but is not limited to, a next generation nodeB (gNB), an evolved NodeB (eNB), an NR, and the like.

The communicator 210 is configured to communicate internally between hardware components in the BS 200, and communicate with the UE 100. The processor 230 is coupled with the memory 240 for processing various instructions stored in the memory 240 to handle a beam blockage in the wireless communication system 1000.

The beam blockage controller 220 detects a blockage of at least one beam. Further, the beam blockage controller 220 determines a duration of the blockage of the at least one beam. The duration of the blockage is determined at a time period at which the blockage is detected. Further, the beam blockage controller 220 applies a beam switch or a link switch for the duration of the blockage.

The beam blockage controller 220 configures an aperiodic beam report on other beam indices, when the at least one beam is blocked. Further, the beam blockage controller 220 performs the beam switch for the duration of the blockage and indicates the blockage to the UE 100 using one of downlink control information (DCI) (e.g., PDCCH) or MAC-CE (e.g., PDSCH) based on the aperiodic beam report.

The beam blockage controller 220 receives a link indication from the UE 100. The link indication indicates to the BS 200 to not use the at least one beam for the duration of the blockage. Further, the beam blockage controller 220 performs the beam switch without using the at least one beam for the duration of the blockage.

The beam blockage controller 220 performs the link switch by forwarding the packet to another base station, when all the beams are blocked.

The memory 240 may be configured to store the instructions to be executed by the processor 230. The memory 240 may include non-volatile storage elements. Examples of such non-volatile storage elements may include magnetic hard discs, optical discs, floppy discs, flash memories, or forms of EPROMs or EEPROMs. In addition, the memory 240 may, in some examples, be considered a non-transitory storage medium. The term "non-transitory" may indicate that the storage medium is not embodied in a carrier wave or a propagated signal. However, the term "non-transitory" should not be interpreted that the memory 240 is non-movable. In some examples, the memory 240 may be configured to store large amounts of information. In certain examples, a non-transitory storage medium may store data that may, over time, change (e.g., in a RAM or a cache).

While FIG. 3A shows various hardware components of the UE 100 and the BS 200, the present disclosure it not intended to be limited thereon. In an embodiment, the UE 100 and the BS 200 may include less or more components. Further, the labels or names of the components are used only for illustrative purpose but are not intended to limit the present disclosure. One or more components may be combined to perform the same or substantially similar function of handling the beam blockage in the wireless communication system 1000.

Figure 3B:
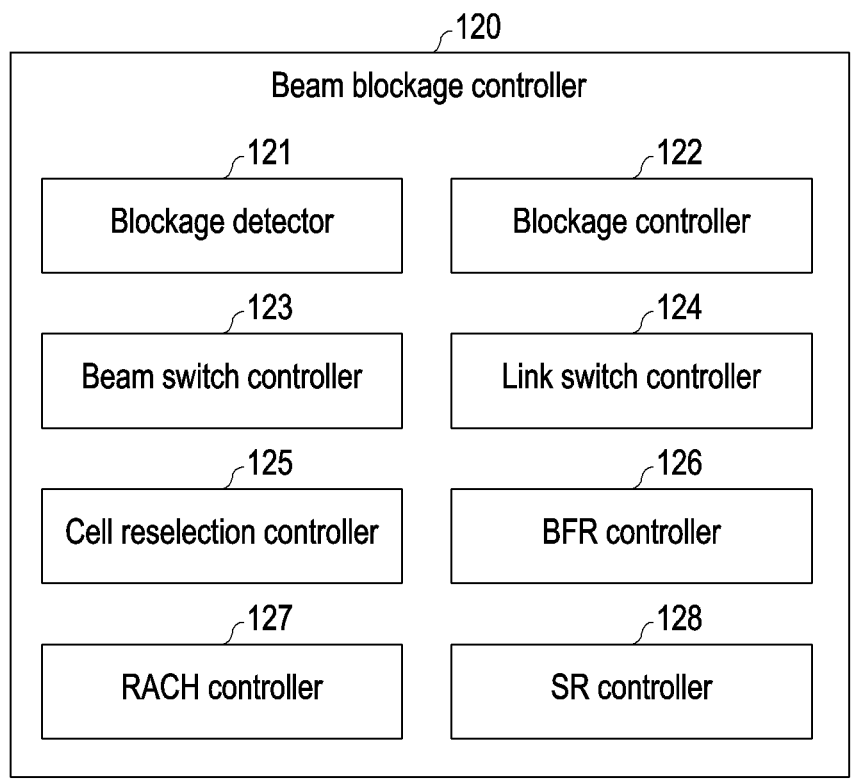
FIG. 3B is a block diagram of a beam blockage controller of a UE, according to an embodiment of the present disclosure.

FIG. 3B is a block diagram of a beam blockage controller 120 of the UE 100, according to an embodiment. Referring to FIG. 3B, the beam blockage controller 120 includes a blockage detector 121, a blockage controller 122, a beam switch controller 123, a link switch controller 124, a cell reselection controller 125, a beam failure recovery (BFR) controller 126, a RACH controller 127, and a SR controller 128.

The blockage detector 121 detects a blockage of the at least one beam. The blockage detector 121 determines an RSRP of the at least one beam or an SINR of the at least one beam at a first time period. Further, the blockage detector 121 determines the RSRP of the at least one beam or the SINR of the at least one beam at a second time period. Further, the blockage detector 121 determines whether a difference between the two RSRPs at the first time period and the second time period or the two SINRs at the first time period and the second time period meets a blockage criteria. Further, the blockage detector 121 detects a blockage at the second time period due to the RSRP or the SINR of the at least one beam when the difference between the two RSRPs at the first time period and the second time period or the two SINRs at the first time period and the second time period meets the blockage criteria. The blockage criteria may be based on the RSRP difference of 10~15 dB with the previous measured statistics stored at the UE 100.

When the UE 100 is in an idle mode, the blockage detector 121 determines a metric for RSRP/SINR using a reference signal. The metric may be synchronization signal RSRP (SS-RSRP) or synchronization signal SINR (SS-SINR). For example, the reference signal may be, but is not limited to, SSs, and physical broadcast channel (PBCH) demodulation reference signals (DMRSs).

When the UE 100 is in a connected mode, the blockage detector 121 determines a metric for RSRP/SINR using a reference signal. The metric may be an SS-RSRSP, an SS-SINR, or channel state information RSRP (CSI-RSRP)/CSI-SINR. For example, the reference signal may be, but is not limited to, SSs and PBCH DMRSs for SS-RSRP and SS-SINR. For example, the reference signal may be, but is not limited to, a CSI reference signal (CSI-RS) for CSI-RSRP and CSI-SINR.

The blockage controller 122 determines a duration of a blockage of at least one beam at the physical layer, where the duration of the blockage is determined at a time period at which the blockage is detected. The blockage controller 122 determines the duration of the blockage at the time period based on a median of historic blockage durations of the time period.

The blockage controller 122 indicates a blockage to at least one higher layer.

The blockage controller 122 determines whether the UE 100 is in a connected mode or an idle mode. When the UE 100 is in the idle mode, the cell reselection controller 125 indicates a blockage to at least one higher layer to hold cell reselection and then perform the cell reselection based on a duration of the blockage.

The cell reselection controller 125 determines whether all beams are blocked. Further, the cell reselection controller 125 determines whether a duration of the blockage meets a measurement evaluation criteria of a serving cell. Further, the cell reselection controller 125 determines whether the duration of the blockage meets the measurement evaluation criteria of the serving cell and a measurement evaluation criteria for cell reselection. Furthermore, the cell reselection controller 125 holds cell reselection and performs cell reselection.

When the UE 100 is in the connected mode, the blockage controller 122 indicates a blockage to at least one higher layer to hold at least one procedure and resume the at least one procedure based on a duration of the blockage or continue the at least one procedure without incrementing a counter associated with the at least one procedure during the duration of the blockage.

The BFR controller 126 determines whether the beam failure instance counter reaches a beam failure instance maximum count. The BFR controller 126 determines the Beam Failure Instance Counter based on the duration of the blockage and a measurement periodicity indicated by the physical layer. The measurement periodicity of a beam is indicated by the physical layer. Further, the BFR controller 126 indicates the blockage to at least one higher layer to hold the at least one procedure and resume the at least one procedure based on a duration of the blockage. The BFR controller 126 is configured to continue the at least one procedure without incrementing the counter associated with the at least one procedure during the duration of the blockage.

When the UE 100 is in the connected mode, the beam switch controller 123 indicates a blockage to at least one higher layer to apply a beam switch or a link switch for the duration of the blockage.

The BFR controller 126 determines whether the Beam Failure Instance Counter does not reach a beam failure instance maximum count. Further, the BFR controller 126 determines whether a duration of a blockage is less than a time of a beam failure recovery timer. Further, the BFR controller 126 holds the beam failure recovery procedure and performs a link switch by rerouting a packet to another link for the duration of the blockage when the duration of the blockage meets the time of the beam failure recovery timer. The BFR controller 126 triggers an early beam failure recovery procedure without waiting for expiry of the beam failure recovery timer and performs a beam switch or a link switch for the duration of the blockage when the duration of the blockage exceeds the beam failure recovery timer.

The beam switch controller 123 performs a beam switch or a link switch by performing a beam selection procedure to select at least one candidate beam from a plurality of candidate beams for an early beam failure recovery procedure. Further, the link switch controller 124 detects whether all the candidate beams are blocked. Further, the link switch controller 124 performs the link switch by rerouting a packet to another link for the duration of the blockage when all candidate beams are blocked. Further, the beam switch controller 123 performs the beam switch by triggering a RACH procedure on the at least one selected candidate beam when at least one of the candidate beams are not blocked.

The RACH controller 127 is configured to hold and resume at least one procedure based on a duration of a blockage, where holding is performed by stopping an ongoing RACH procedure for the duration of the blockage and the RACH procedure is resumed after an offset which is obtained based on the duration of the blockage.

The SR controller 128 is configured to hold and resume at least one procedure based on a duration of a blockage, where holding is performed by stopping an ongoing SR procedure for the duration of the blockage and the SR procedure is resumed after the offset obtained based on the duration of the blockage.

The blockage controller 122 is configured to hold and resume at least one procedure based on a duration of a blockage, where holding is performed by stopping an ongoing tx/retx procedure for the duration of the blockage and the tx/retx procedure is resumed after the duration of the blockage.

The link switch controller 124 is configured to reroute a packet to another link for a duration of a blockage. The link switch controller 124 is configured to reroute the packet by indicating a PDCP on the duration of the blockage based on a higher layer retransmission timer. Further, the link switch controller 124 is configured to select another link for rerouting the packet based on the duration of the blockage and the higher layer retransmission timer. The link switch controller 124 is configured to reroute the packet by indicating the PDCP on the duration of the blockage based on a PDCP t-Reordering timer. Further, the link switch controller 124 is configured to select another link for re-routing the packet based on the duration of the blockage and the PDCP t-reordering timer.

The blockage controller 122 provides a link indication to inform the BS 200 in the wireless communication system 1000 to not use at least one beam for a duration of a blockage.

Figure 3C:
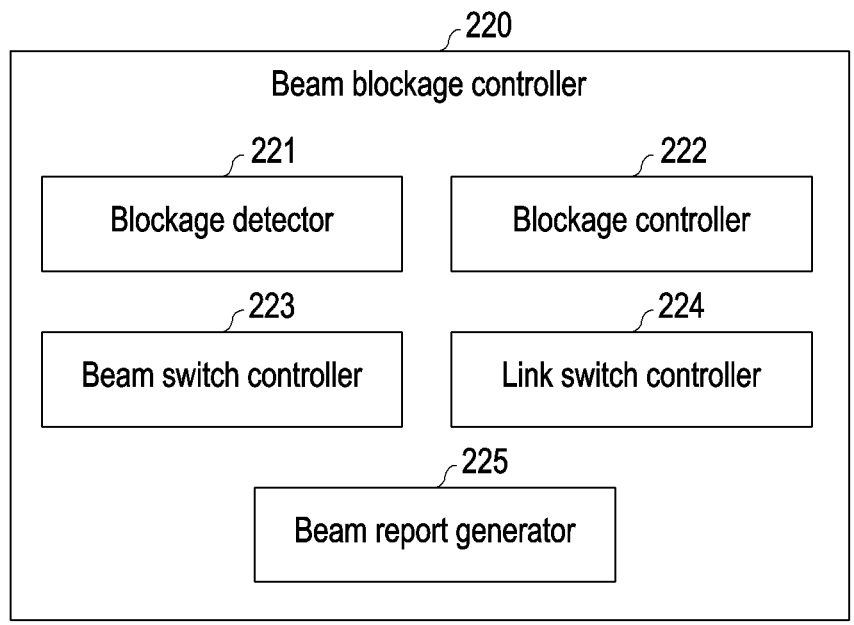
FIG. 3C is a block diagram of a beam blockage controller of a UE, according to an embodiment of the present disclosure.

FIG. 3C is a block diagram of a beam blockage controller 220 of the BS 200, according to an embodiment. Referring to FIG. 3C, the beam blockage controller 220 includes a blockage detector 221, a blockage controller 222, a beam switch controller 223, a link switch controller 224, and a beam report generator 225.

The blockage detector 221 detects a blockage of at least one beam. Further, the blockage controller 222 determines a duration of the blockage of the at least one beam. Further, the beam switch controller 223 applies a beam switch or a link switch for the duration of the blockage.

The beam switch controller 223 configures an aperiodic beam report on other beam indices, when at least one beam is blocked. Based on determining a duration of the blockage on a particular beam, the BS 200 triggers an aperiodic measurement and reporting configuration on certain beam indices for beam switching.

Further, the beam switch controller 223 performs a beam switch for the duration of the blockage and indicates the blockage to the UE 100 using one of DCI (e.g., PDCCH) or MAC-CE (e.g., PDSCH) based on the aperiodic beam report.

The beam switch controller 223 receives a link indication from the UE 100. Further, the beam switch controller 223 performs the beam switch without using the at least one beam for the duration of the blockage.

The link switch controller 224 performs a link switch by forwarding a packet to another base station, when all the beams are blocked.

Figure 4A:
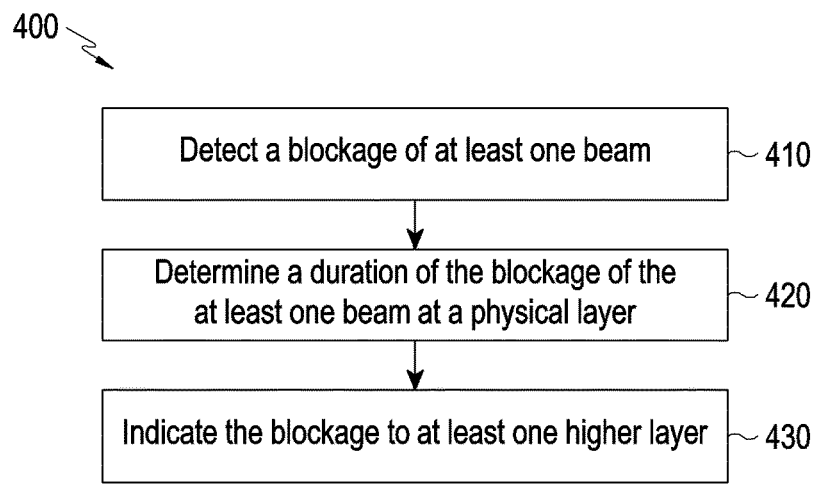
FIG. 4A is a flowchart of a method of handling a beam blockage in a wireless communication system, according to an embodiment of the present disclosure.

FIG. 4A is a flow diagram 400 of a method of handling a beam blockage in the wireless communication system 1000, according to an embodiment.

Referring to FIG. 4A, at step 410, the method, by the blockage detector 121, detects a blockage of at least one beam. At step 420, the method, by the blockage controller 122, determines a duration of the blockage of the at least one beam at the physical layer, wherein the duration of the blockage is determined at a time period at which the blockage is detected. At step 430, the method, by the blockage controller 122, indicates the blockage to at least one higher layer.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like.

Figure 4B:
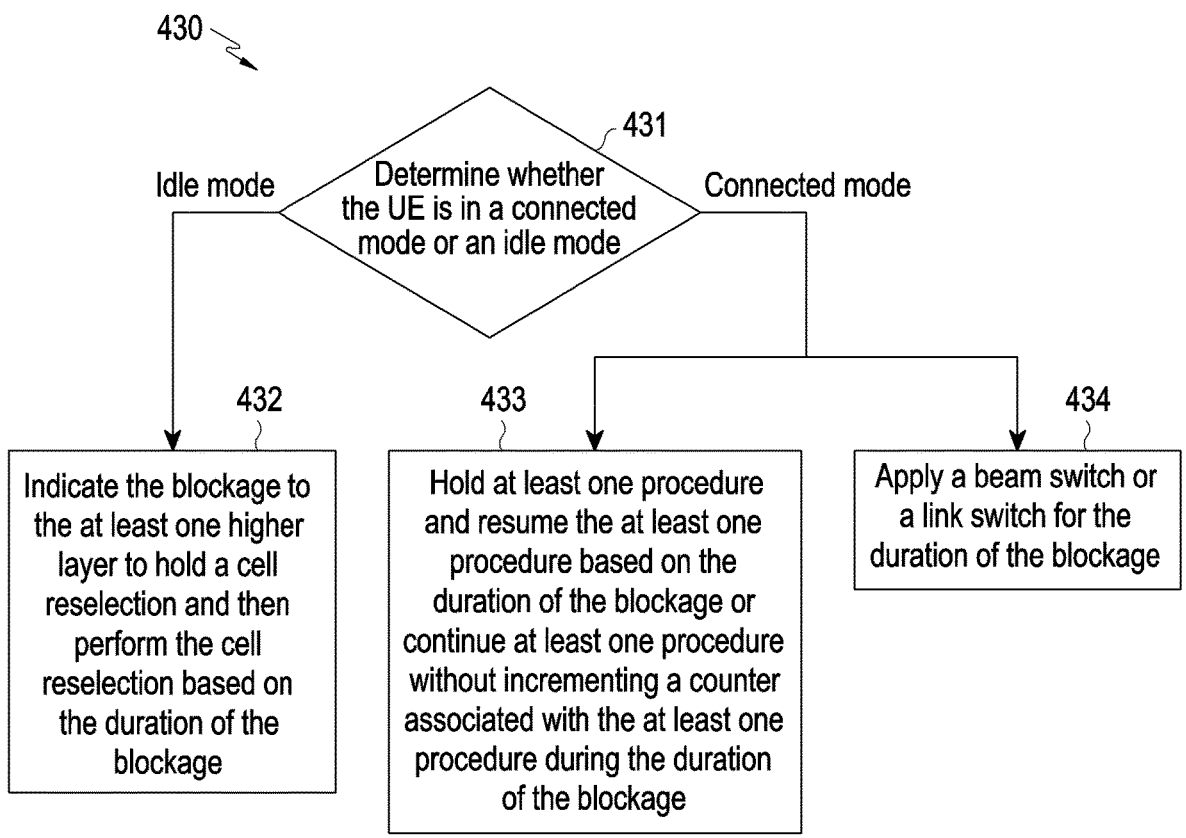
FIG. 4B is a flowchart of a method of indicating a beam blockage in a wireless communication system, according to an embodiment of the present disclosure.

FIG. 4B is a flow diagram 430 of a method of indicating a beam blockage in a wireless communication system 1000, according to an embodiment.

Referring to FIG. 4B, at step 431, the method, by the blockage controller 122, determines whether the UE 100 is in a connected mode or an idle mode. When the UE 100 is in the idle mode, at step 432, the method, by the blockage controller 122, indicates a blockage to at least one higher layer for holding cell reselection and then performing cell reselection based on a duration of the blockage.

When the UE 100 is in the connected mode, at step 433, the method, by the blockage controller 122, indicates a blockage to at least one higher layer for holding at least one procedure and resuming the at least one procedure based on a duration of the blockage. The method, by the blockage controller 122, continues the at least one procedure without incrementing a counter associated with the at least one procedure during the duration of the blockage.

When the UE 100 is in a connected mode, at step 434, the method, by the blockage controller 122, indicates the blockage to at least one higher layer for applying a beam switch or a link switch for a duration of the blockage.

The various actions, acts, blocks, steps, or the like in the flow diagram 430 may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
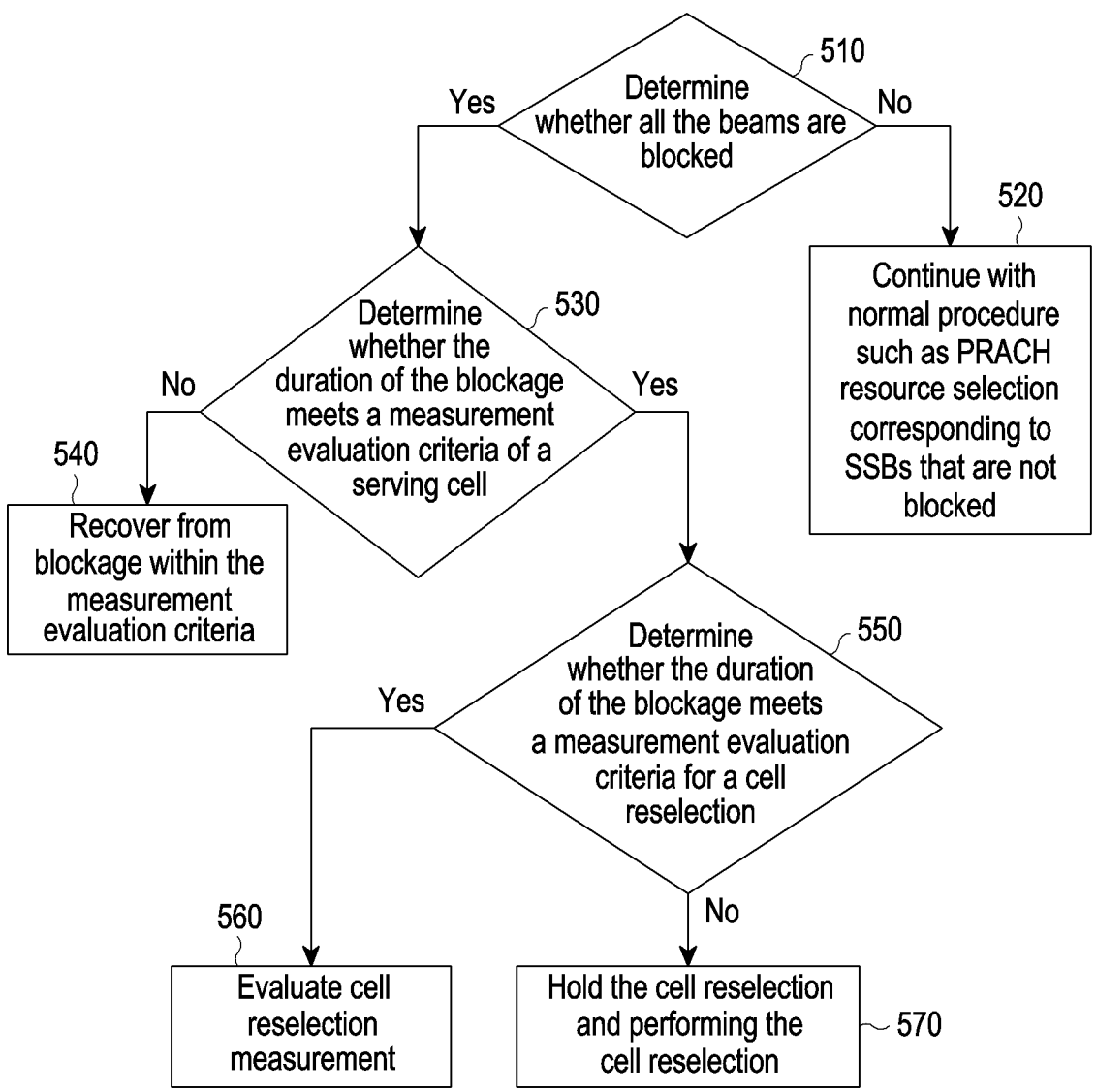
FIG. 5 is a flowchart of a method of handling a beam blockage in a wireless communication system when a UE is in an idle mode, according to an embodiment of the present disclosure.

FIG. 5 is a flow diagram 500 of a method of handling a beam blockage in a wireless communication system when a UE is in an idle mode, according to an embodiment.

Referring to FIG. 5, at step 510, the method, by the blockage controller 122, determines whether all beams are blocked. If all the beams are not blocked then, at step 520, the method, by the blockage controller 122, continues with a normal procedure such as PRACH resource selection corresponding to SSBs that are not blocked.

If all of the beams are blocked then, at step 530, the method, by the blockage controller 122, determines whether a duration of the blockage meets a measurement evaluation criteria of a serving cell.

If the duration of the blockage does not meet the measurement evaluation criteria of the serving cell then, at step 540, the method, by the blockage controller 122, recovers from the blockage within the measurement evaluation criteria.

If the duration of the blockage meets the measurement evaluation criteria of the serving cell then, at step 550, the method, by the blockage controller 122, determines whether the duration of the blockage meets the measurement evaluation criteria of the serving cell and the measurement evaluation criteria for cell reselection.

Further, if the duration of the blockage meets the measurement evaluation criteria of the serving cell and the measurement evaluation criteria for the cell reselection then, at step 560, the method, by the blockage controller 122, evaluates a cell reselection measurement.

If the duration of the blockage ($\tau_{Blockage}$) does not meet the measurement evaluation criteria of the serving cell ($T_{eval}$) and the measurement evaluation criteria for the cell reselection $T_{Reselection}$ then, at step 570, the method, by the blockage controller 122, holds the cell reselection and performs the cell reselection.

When the UE 100 is in an idle mode and if the UE 100 is able to recover from the blockage before the UE 100 performs the cell reselection, there is no need to do cell reselection when, as in Equation (4) as follows:

$$\tau_{Blockage} < T_{eval} + T_{Reselection} \quad (4)$$

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the disclosure.

Figure 6:
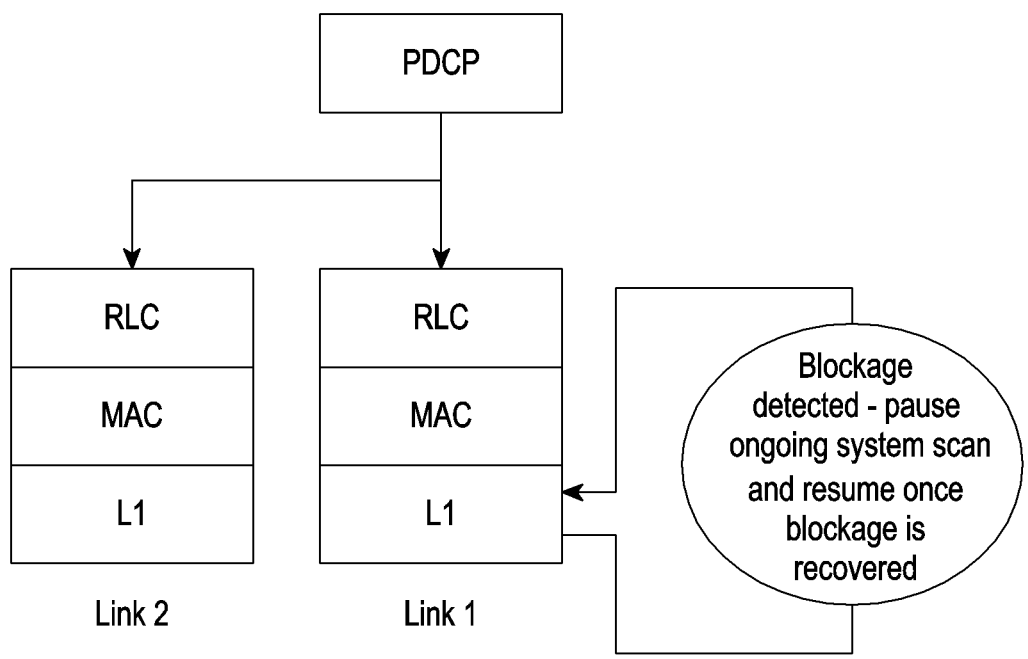
FIG. 6 is an illustration of a protocol architecture of a UE, when the UE is in an idle mode, according to an embodiment of the present disclosure.

FIG. 6 is an illustration of a protocol architecture of the UE 100, when the UE 100 is in an idle mode, according to an embodiment. When the UE 100 is in the idle mode, all beams are blocked, $\tau_{Blockage} > T_{eval}$, and $\tau_{blockage} < T_{eval} + T_{Reselection}$ for serving cell measurement duration ($T_{eval}$) then the UE 100 recovers, from $T_{eval}$, the blockage within the cell reselection measurement ($T_{Reselection}$), but the UE 100 does not need to perform a cell reselection measurement.

Referring to FIG. 6, an L1 layer of the UE 100 indicates a blockage to the higher layers. The L1 layer indicates the duration of the blockage to radio resource management (RRM), where RRM uses the duration of the blockage ($\tau_{Blockage}$) to avoid declaring a long-term failure. Below are two possible options:

a. RRM may decide to pause a system scan during the blockage period or b. RRM may decide to list frequencies which were scanned while the blockage was detected and have additional acquisition attempts on those frequencies.

Figure 7A:
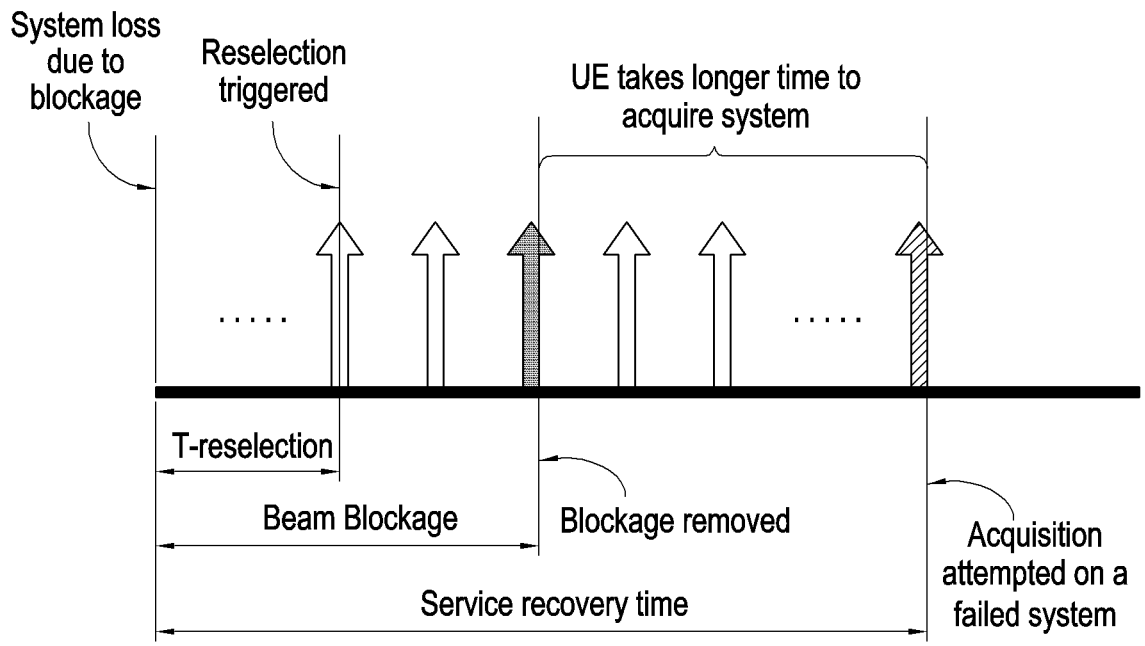
FIG. 7A is an illustration of blockage detection when a UE is in an idle mode, according to the prior art.

FIG. 7A is an illustration of blockage detection when the UE 100 is in an idle mode, according to the prior art. In conventional methods, the UE 100 encounters a system loss due to a temporary blockage. Referring to FIG. 7A, each arrow in the graph represents an evolved-UTRA absolute radio frequency channel number (EARFCN). Upon detecting a blockage, the UE 100 tries to find another system. The other system may be another NR beam, a new radio absolute radio-frequency channel number (NR ARFCN), an NR band, or another RAT. However, the UE 100 does not search for another system and does not switch to another system, once a blockage is recovered from. Still, reacquiring the service depends on the time the RRM takes to complete a band scan and repeat a scan cycle.

Figure 7B:
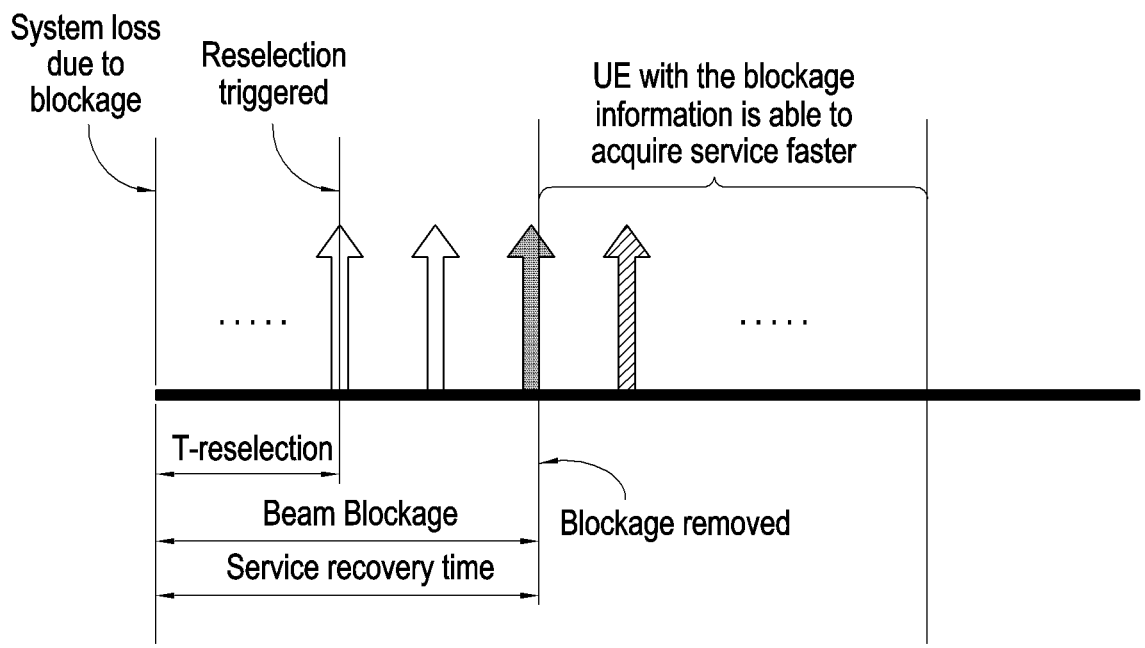
FIG. 7B is an illustration of blockage detection when a UE is in an idle mode, according to an embodiment of the present disclosure.

FIG. 7B is an illustration of blockage detection when the UE 100 is in an idle mode, according to an embodiment. The UE 100 may encounter system loss due to a temporary blockage. Referring to FIG. 7B, upon detecting a blockage, the UE 100 searches for another system. The UE 100 determines a duration of the blockage and indicates the duration of the blockage to a higher layer. Further, when the blockage is recovered from or the duration of the blockage is expired, the UE 100 re-attempts/retransmits an EARFCN on which the UE 100 originally detected the blockage. Hence, the UE 100 is able to acquire service faster.

Figure 8:
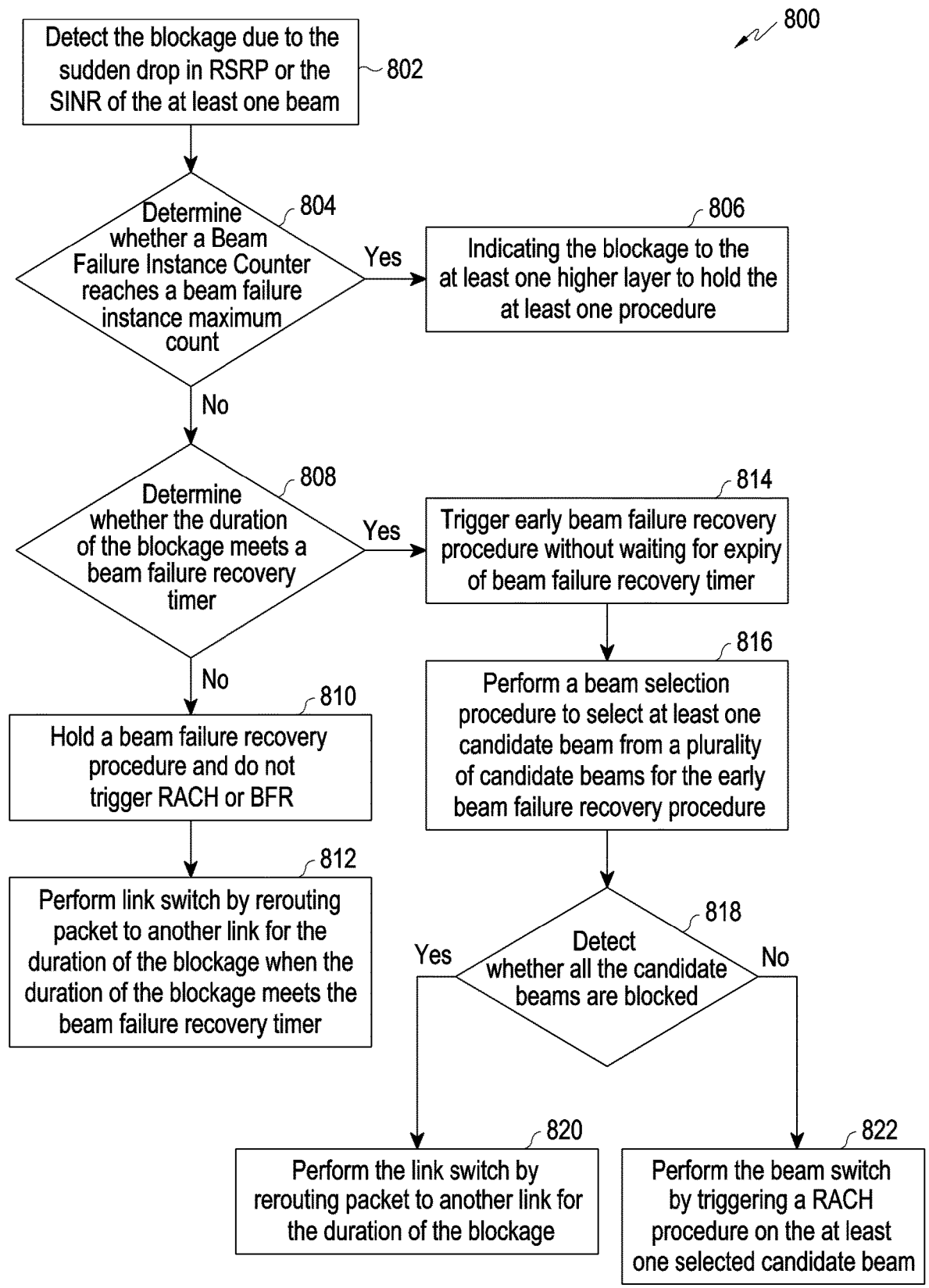
FIG. 8 is a flowchart of a method of handling a beam blockage in a wireless communication system when a UE is in a connected mode, according to an embodiment of the present disclosure.

FIG. 8 is a flow diagram of a method for handling a beam blockage in a wireless communication system when a UE is in a connected mode, according to an embodiment.

Referring to FIG. 8, at step 802, the method, by the blockage detector 121, detects a blockage due to a sudden drop in an RSRP or an SINR of at least one beam. At step 804, the method, by the BFR controller 126, determines whether a Beam Failure Instance Counter reaches a beam failure instance maximum count.

If the blockage duration is not sufficient to declare BFR, but the blockage may be sufficient to lose data packets during $\tau_{Blockage}$ at multiple layers. Then, the UE 100 holds data packets or procedures at various layers until the beam block duration to prevent packet loss. The UE 100 holds the packets or procedures until BFI_counter<beamFailureInstanceMaxCount.

If the beam failure instance counter reaches the beam failure instance maximum count then, at step 806, the method, by the BFR controller 126, indicates the blockage to the at least one higher layer to hold the at least one procedure.

If the beam failure instance counter does not reach the beam failure instance maximum count then, at step 808, the method, by the BFR controller 126, determines whether the duration of the blockage is less than a beam failure recovery timer.

If the blockage duration is sufficient to trigger BFR, but the UE 100 is able to recover from the blockage before a recovery timer expires, then there is no need to trigger a RACH for BFR since the UE 100 can recover from the blockage before the BFR recovery timer expires. Furthermore, the UE 100 re-routes the data to another link for the blockage duration to avoid latency. The UE 100 may recover from a blockage before the BFR recovery timer expires where BFI_counter=beamFailureInstanceMaxCount && $\tau_{Blockage}$<beamFailureRecoveryTimer.

If the duration of the blockage does not meet the beam failure recovery timer then at step 810, the method, by the BFR controller 126, holds the beam failure recovery procedure and does not trigger RACH or BFR. At step 812, the method, by the link switch controller 124, performs the link switch by rerouting a packet to another link for the duration of the blockage.

If the duration of the blockage meets the beam failure recovery timer then at step 814, the method, by the BFR controller 126, triggers an early beam failure recovery procedure without waiting for expiry of the beam failure recovery timer.

Further, at step 816, the method, by the BFR controller 126, performs a beam selection procedure to select at least one candidate beam from a plurality of candidate beams for the early beam failure recovery procedure.

If the UE 100 is not able to identify a new candidate beam (SSB/CSI-RS ID) based on a candidate beam threshold configured by a higher layer then all of the beams are blocked. The UE 100 can switch the link at a higher layer (e.g., PDCP) to send the data and hence reduce the latency due to $\tau_{Blockage}$.

At 818, the method, by the blockage detector 121, detects whether all the candidate beams are blocked. If all the candidate beams are blocked then at step 820, the method, by the link switch controller 124, performs a link switch by rerouting a packet to another link for the duration of the blockage.

If all the candidate beams are not blocked then, at step 822, the method, by the beam switch controller 123, performs a beam switch by triggering a RACH procedure on the at least one selected candidate beam.

When the UE is aware of the need of Beam failure Recovery based on an estimated Beam Failure Instance Counter, $BFI\_Counter_{Estimated}$, the method triggers an early RACH procedure for BFR on a new candidate beam instead of waiting until reaching the maximum count or the expiry of detection timer.

$$BFI\_counter = beamFailureInstanceMaxCount \,\&\&\, \tau_{Blockage} > beamFailureRecoveryTimer.$$

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the disclosure.

Figure 9:
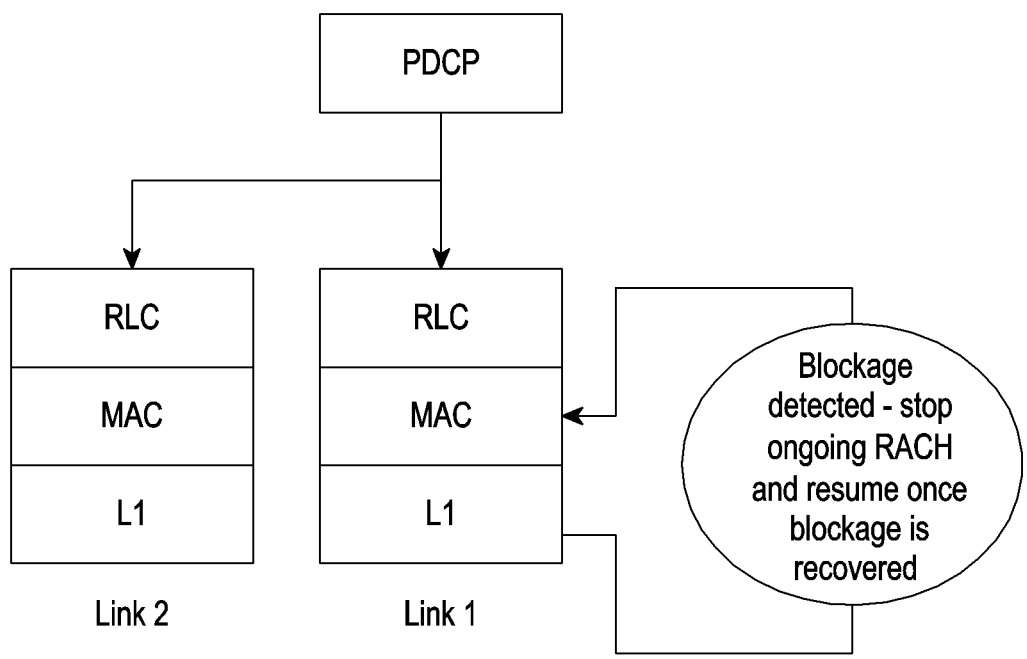
FIG. 9 is an illustration of a protocol architecture of a UE, when the UE is in a connected mode, according to an embodiment of the present disclosure.

FIG. 9 is an illustration of a protocol architecture of the UE 100, when the UE 100 is in a connected mode, according to an embodiment. Referring to FIG. 9, when the UE 100 is in the connected mode, and whenever the UE 100 is blocked for a time which is not sufficient to declare a beam failure. Then, the UE 100 may utilize the duration of the blockage to indicate to the higher layers to hold procedures, when $BFI_{counterEstimated} < beamFailureInstanceMaxCount$. The L1 layer indicates to the MAC layer to stop an ongoing RACH and resume the RACH after an offset, wherein the offset which is determined based on the duration of the blockage.

Figure 10A:
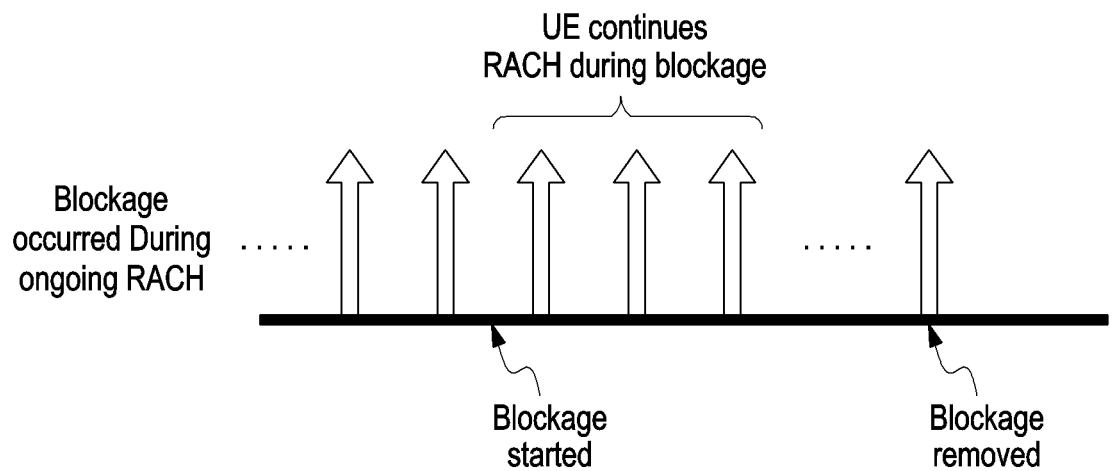
FIG. 10A is an illustration of blockage detection when a UE is in a connected mode, according to the prior art.

FIG. 10A is an illustration of blockage detection when the UE 100 is in a connected mode, according to the prior art. Referring to FIG. 10A, the UE 100 encounters a temporary blockage while a RACH procedure is ongoing. Referring to FIG. 10A, the UE 100 continues with the RACH procedure since the blockage is not detected. Further, the UE 100 applies power ramp-up for RACH re-attempts which causes battery consumption/heating.

Figure 10B:
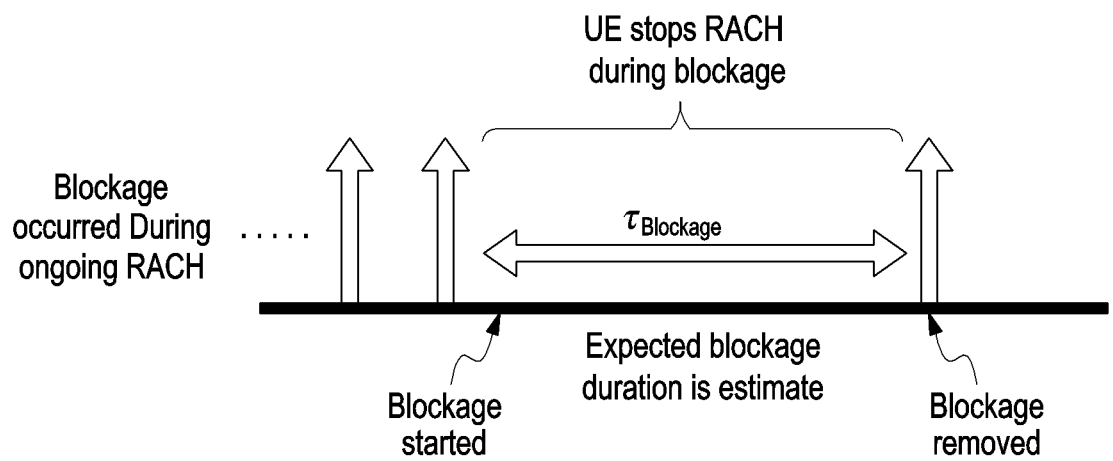
FIG. 10B is an illustration of blockage detection when a UE is in a connected mode, according to an embodiment of the present disclosure.

FIG. 10B is an illustration of blockage detection when the UE 100 is in a connected mode, according to an embodiment. Referring to FIG. 10B, the UE 100 encounters a temporary blockage while a RACH procedure is ongoing. The UE 100 detects the blockage and estimates the duration of the blockage. Further, the proposed method starts a new timer ($T_{blockagebackoff}$) to stop the UE 100 from sending a RACH for the next $\tau_{Blockage}$ time.

Figure 11:
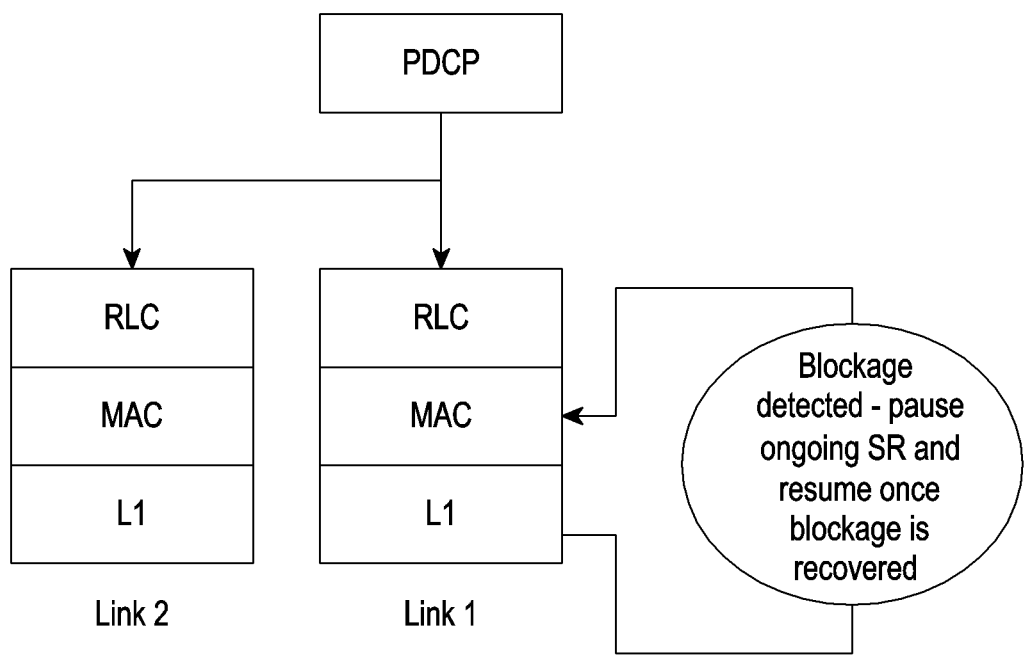
FIG. 11 is an illustration of a protocol architecture of a UE, when the UE is in a connected mode, according to an embodiment of the present disclosure.

FIG. 11 is an illustration of a protocol architecture of the UE 100, when the UE 100 is in a connected mode, according to an embodiment. Referring to FIG. 11, when the UE 100 is in the connected mode, and whenever the UE 100 is blocked for a time which is not sufficient to declare a beam failure, the UE 100 may utilize the duration of the blockage to indicate to the higher layers to hold procedures, when $BFI_{counterEstimated} < beamFailureInstanceMaxCount$. The L1 layer indicates that the MAC layer has two options to perform service recovery (SR):

a. Stop an ongoing SR procedure and resume the SR procedure when the blockage is recovered from (or)

b. Continue an ongoing SR procedure but do not increment an SR_COUNTER during the blockage duration ($\tau_{Blockage}$) during the duration of the blockage.

Figure 12A:
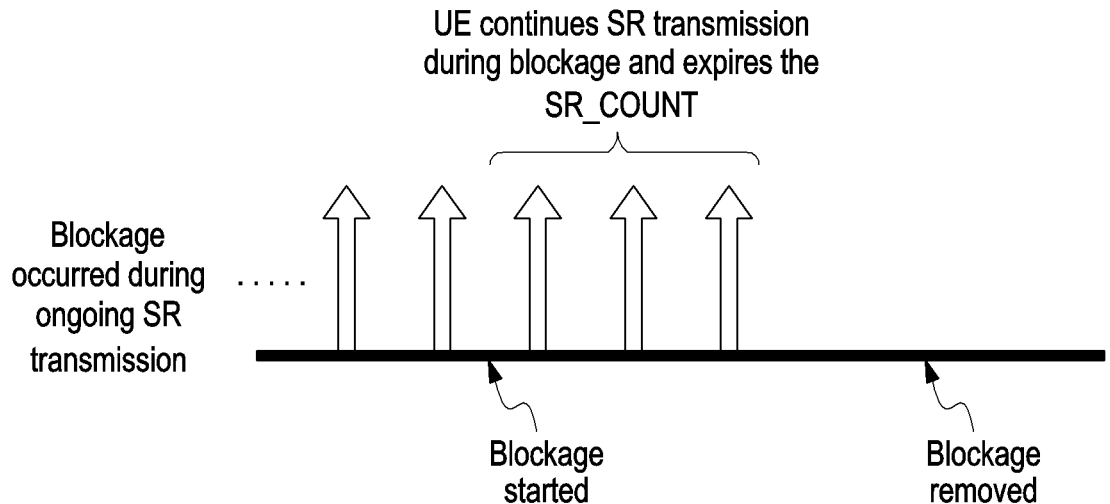
FIG. 12A is an illustration of blockage detection when a UE is in a connected mode, according to the prior art.

FIG. 12A is an illustration of blockage detection when the UE 100 is in a connected mode, according to the prior art. Referring to FIG. 12A, the UE 100 encounters a temporary blockage, while an SR transmission is ongoing. The UE 100 keeps transmitting an SR for SR_COUNTER times. Further, the UE 100 declares a radio link failure (RLF) and attempts to select a suitable cell/beam.

Figure 12B:
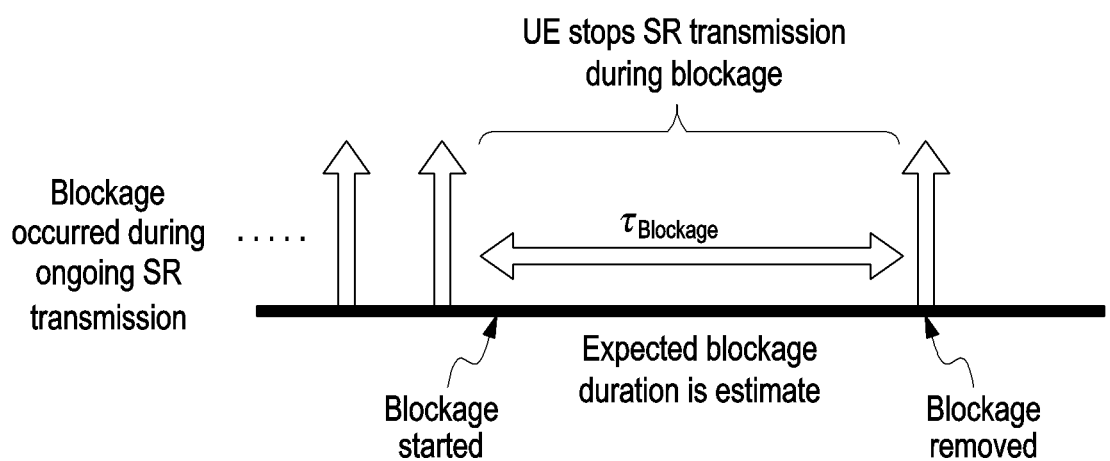
FIG. 12B is an illustration of blockage detection when a UE is in a connected mode, according to an embodiment of the present disclosure.

FIG. 12B is an illustration of blockage detection when the UE 100 is in a connected mode, according to an embodiment. Referring to FIG. 12B, the UE 100 encounters a system loss due to a temporary blockage. The UE 100 detects a blockage and has two options to perform an SR as follows:

a. Upon detecting the blockage, the UE 100 starts a new timer ($T_{blockagebackoff}$) to stop any SR transmission. Further, the UE 100 resumes the SR transmission when the blockage is recovered from.

b. The UE 100 allows radio link control (RLC) retransmission but does not increment the RETX_COUNT.

Figure 13:
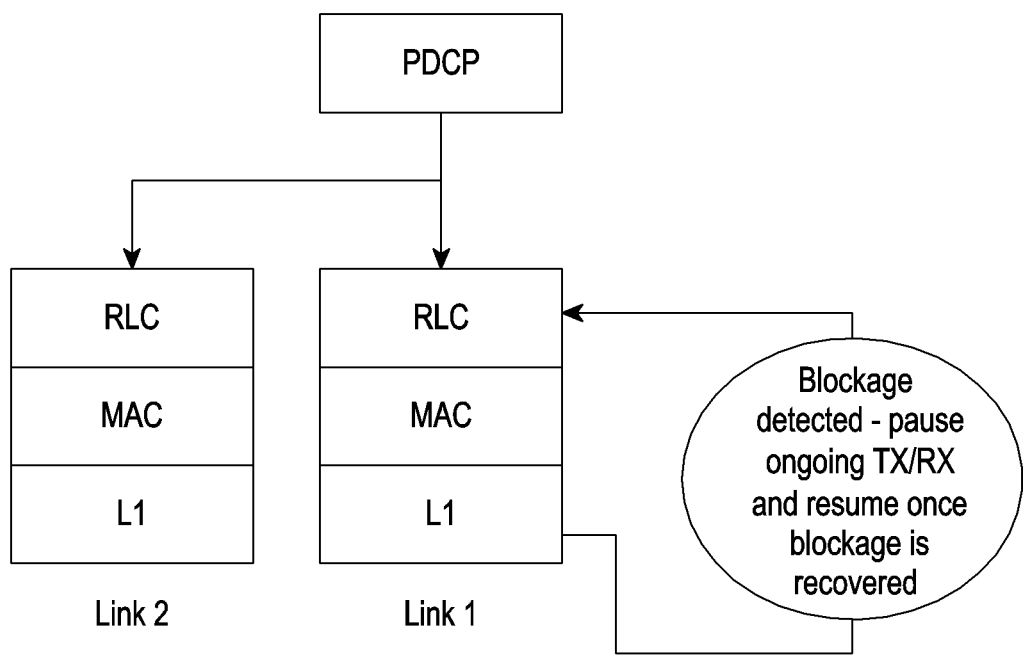
FIG. 13 is an illustration of a protocol architecture of a UE, when the UE is in a connected mode, according to an embodiment of the present disclosure.

FIG. 13 is an illustration of a protocol architecture of the UE 100, when the UE 100 is in a connected mode, according to an embodiment. When the UE 100 is in the connected mode, and whenever the UE 100 is blocked for a time which is not sufficient to declare a beam failure then the UE 100 may utilize the duration of the blockage to indicate to the higher layers to hold procedures such as ongoing transmission/reception (TX/RX), when $BFI_{counterEstimated} < beamFailureInstanceMaxCount$. The L1 layer indicates to the RLC layer to avoid declaring the RLF due to RLC max retx counter. Below are two possible options:

a. The UE 100 indicates to the RLC to stop ongoing tx/retx and resume after the duration of $\tau_{Blockage}$ (or)

b. The UE 100 indicates to the RLC to continue ongoing tx/retx but not to increment an retx count.

Figure 14A:
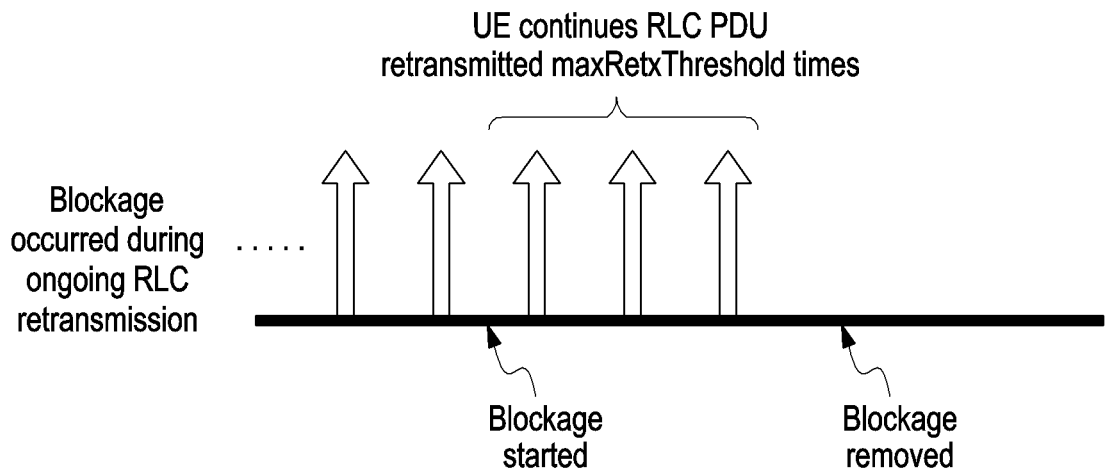
FIG. 14A is an illustration of blockage detection when a UE is in a connected mode, according to the prior art.

FIG. 14A is an illustration of blockage detection when the UE 100 is in a connected mode, according to the prior art. Referring to FIG. 14A, the UE 100 encounters a temporary blockage while RLC retransmission is ongoing. The UE 100 keeps transmitting an RLC protocol data unit (PDU) for maxRetxThreshold (RLC configuration) times. Further, the UE 100 declares an RLF and attempts to select suitable cell/beam.

Figure 14B:
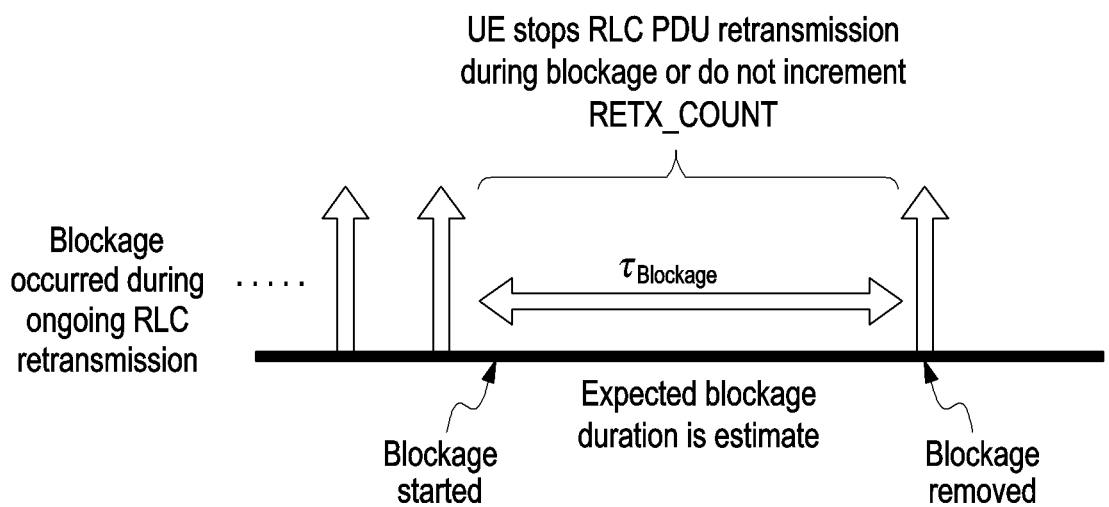
FIG. 14B is an illustration of blockage detection when a UE is in a connected mode, according to an embodiment of the present disclosure.

FIG. 14B is an illustration of blockage detection when the UE 100 is in a connected mode, according to an embodiment. Referring to FIG. 14B, the UE 100 encounters a system loss due to the temporary blockage. The UE 100 detects the blockage and estimates a duration of the blockage. Further, the L1 layer indicates to the RLC layer to avoid declaring the RLF using the possible options as follows:

a. The UE 100 starts a new timer to stop the UE 100 from retransmitting an RLC PDU for $\tau_{Blockage}$ time. Further, when the estimated $\tau_{Blockage}$ time > maxRetxThreshold expiry time, then the UE 100 might search for another suitable cell/beam and attempt SR or b. The UE 100 allows RLC retransmission but does not increment the RETX_COUNT.

Figure 15:
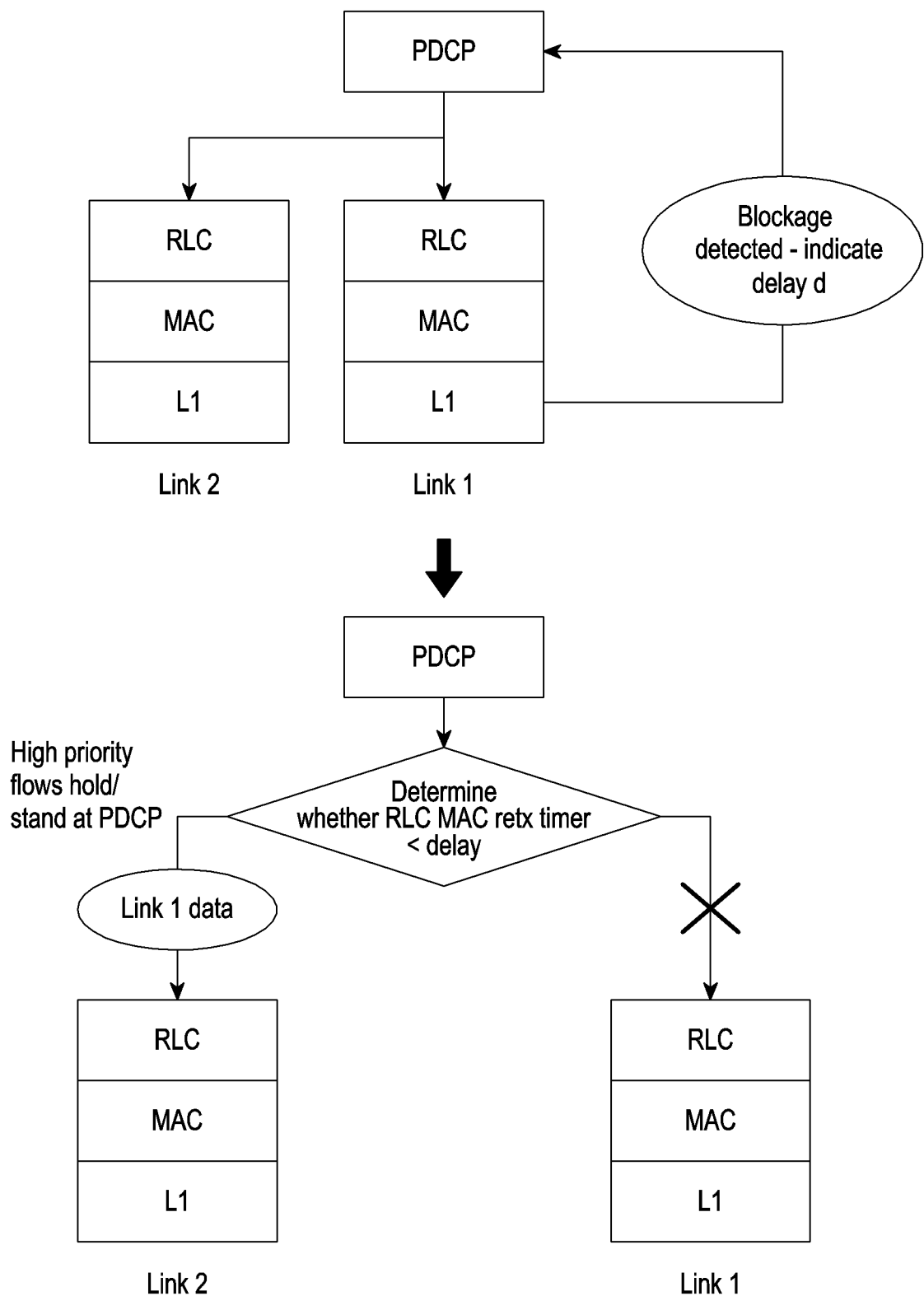
FIG. 15 is an illustration of a protocol architecture of a UE, when the UE is in a connected mode, according to an embodiment of the present disclosure.

FIG. 15 is an illustration of a protocol architecture of the UE 100, when the UE 100 is in a connected mode, according to an embodiment. Referring to FIG. 15, when the UE 100 is in the connected mode, and whenever the UE 100 is able to recover before a recovery timer, when data packets can be switched to another link at PDCP such as BFI_counter= beamFailureInstanceMaxCount&&$\tau_{\_Blockage}$<beamFailureRecoveryTimer.

When the UE 100 is in a connected mode and all beams are blocked, the UE 100 may find a best beam within the recovery timer such as $\tau_{Blockage}$>beamFailure RecoveryTimer.

The L1 layer indicates to the PDCP layer the duration of blockage $\tau_{Blockage}$. Further, based on the RLC-MAC Re-Tx timer, a PDCP TX entity may determine a link for sending data. The PDCP TX entity choses a Link 2 to transmit data associated with a Link 1.

Figure 16:
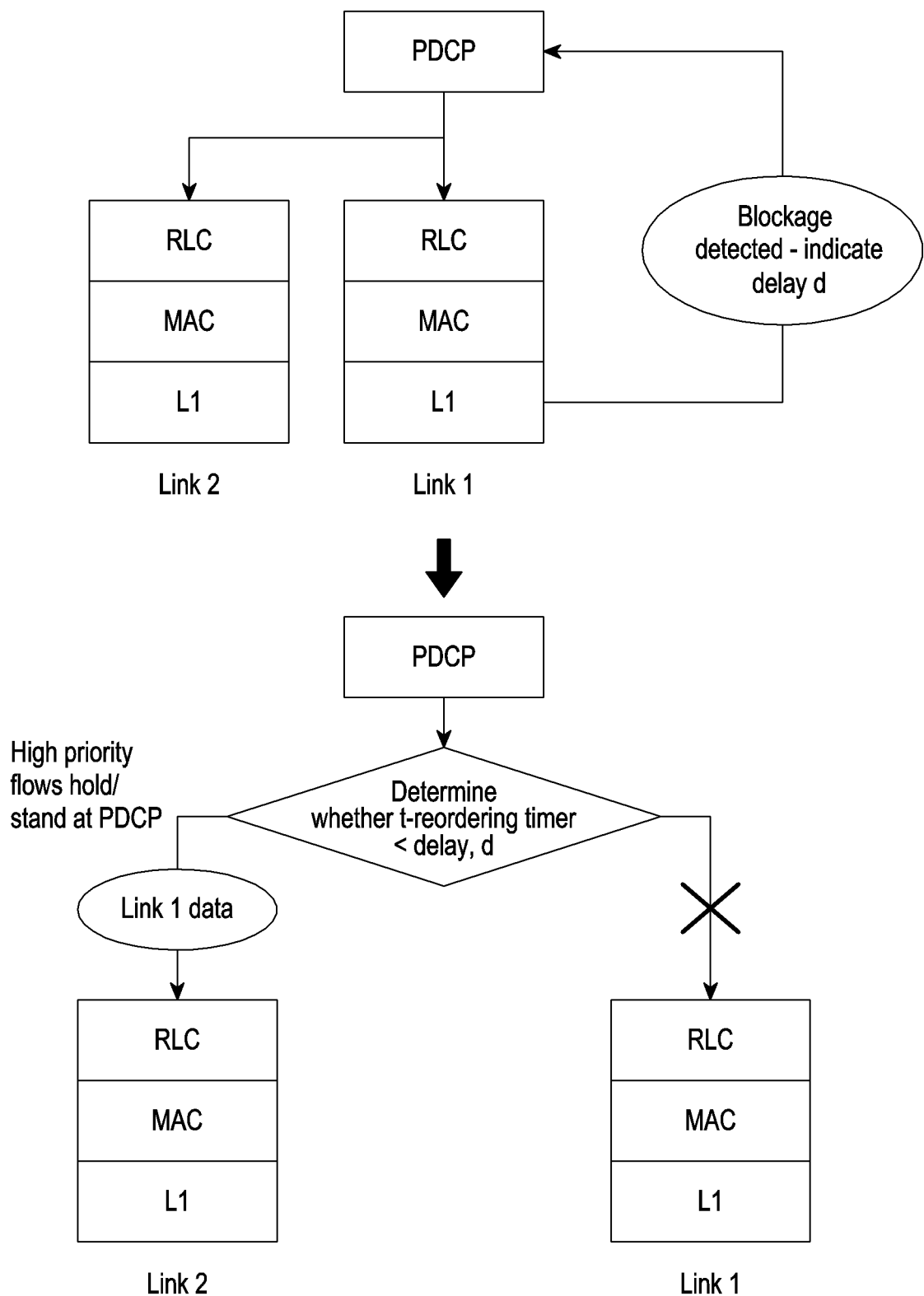
FIG. 16 is an illustration of a protocol architecture of a UE, when the UE is in a connected mode, according to an embodiment of the present disclosure.

FIG. 16 is an illustration on a protocol architecture of the UE 100, when the UE 100 is in a connected mode, according to an embodiment. Referring to FIG. 16, the L1 layer indicates to the PDCP layer about the duration of a blockage $\tau_{Blockage}$. Further, based on a PDCP t-Reordering timer, a PDCP TX entity may determine a link for sending data to avoid probable expiry of a t-Reordering timer in the PDCP RX entity. The PDCP TX entity choses Link 2 to transmit data associated with Link 1.

Figure 17A:
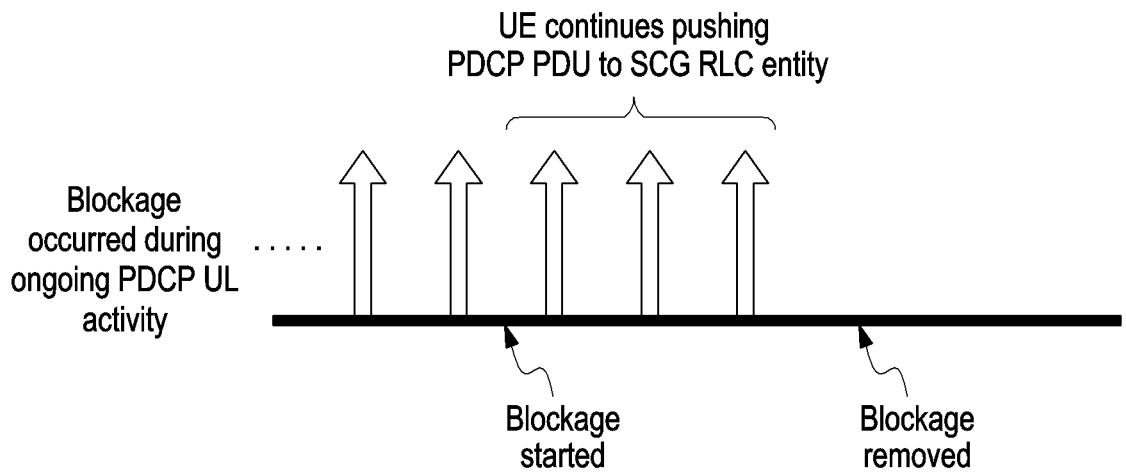
FIG. 17A is an illustration of blockage detection when a UE is in a connected mode, according to the prior art.

FIG. 17A is an illustration of blockage detection when the UE 100 is in a connected mode, according to the prior art. Referring to FIG. 17A, the UE 100 encounters a temporary blockage on a secondary cell group (SCG) leg. The PDCP continues uplink (UL) data transmission on the affected RLC entity. All of the RLC PDU will be present in an RLC retransmission buffer until the $\tau_{Blockage}$.

Figure 17B:
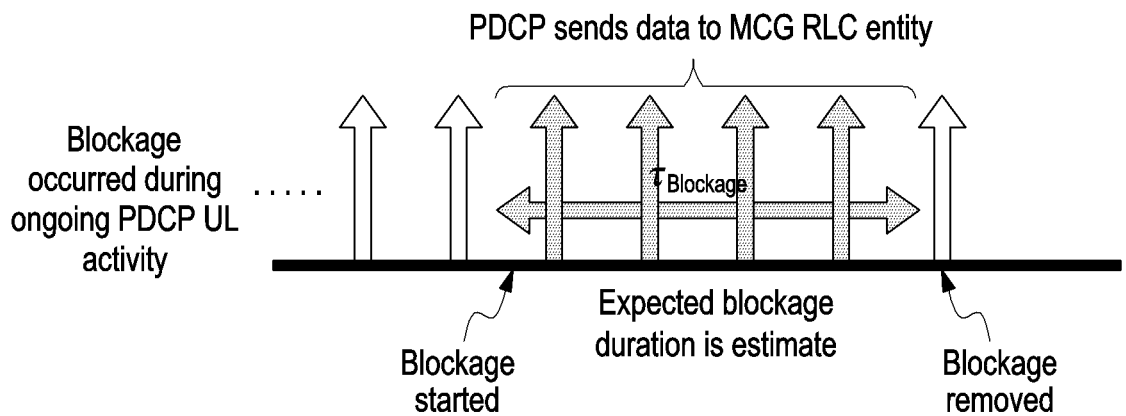
FIG. 17B is an illustration of blockage detection when a UE is in a connected mode, according to an embodiment of the present disclosure.

FIG. 17B is an illustration of blockage detection when the UE 100 is in a connected mode, according to an embodiment as disclosed herein. Referring to FIG. 17B, the UE 100 encounters a temporary blockage on an SCG leg. The PDCP layer detects a blockage from a lower layer along with an estimated duration of blockage $\tau_{Blockage}$. Further, the PDCP dynamically switches the transmission from the SCG to a master cell group (MCG) leg. After the duration of blockage $\tau_{Blockage}$ time, the PDCP may switch back to the original leg such as an SCG leg.

Figure 18:
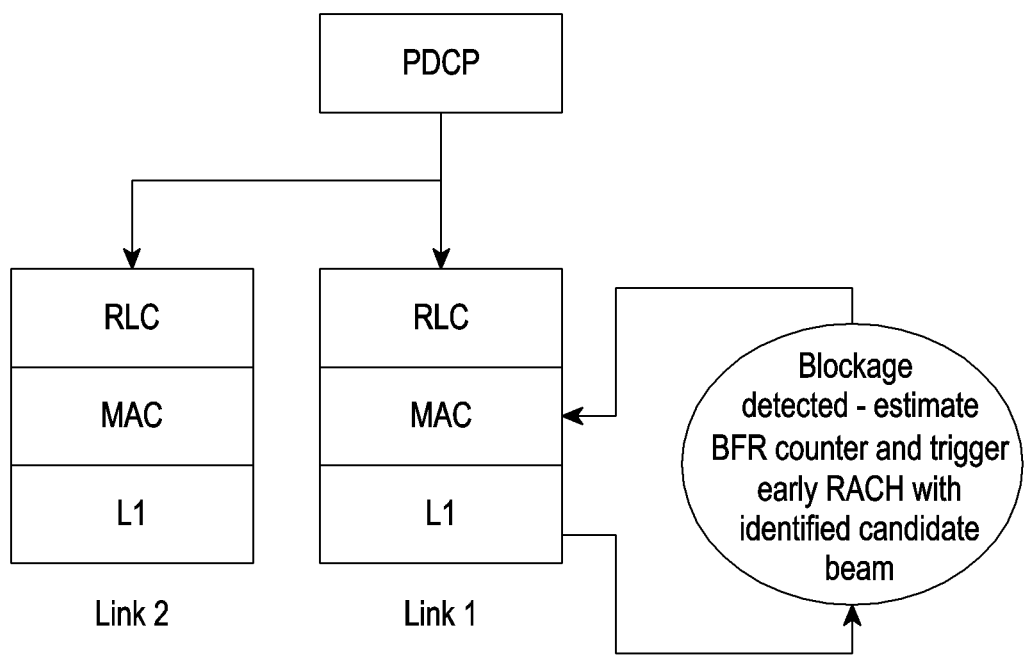
FIG. 18 is an illustration of a protocol architecture of a UE, when the UE is in a connected mode, according to an embodiment of the present disclosure.

FIG. 18 is an illustration of a protocol architecture of the UE 100, when the UE 100 is in a connected mode, according to an embodiment. referring to FIG. 18, when the UE 100 is in the connected mode, and the UE 100 indicates a need of beam failure recovery based on an estimated Beam Failure Instance Counter, BFI_Counter$_{Estimated}$ such as BFI_counter_estimated=beamFailureInstanceMaxCount&& $\tau_{Blockage}$>beamFailureRecoveryTimer. Further, the UE 100 is able to identify candidate beams from a candidateBeamRSList from BeamFailureRecoveryConfig. Based on statistics of candidate beam selection for BFR, the UE 100 may optimize the candidate selection procedure and prioritize the candidateBeamRSList from the BeamFailureRecoveryConfig. Furthermore, the UE 100 may trigger an early RACH procedure for BFR on a new candidate beam instead of waiting until reaching a maximum count or the expiry of a detection timer. Hence, L1 indicates to the MAC layer to start an early RACH with a PRACH resource corresponding to the newly identified candidate beam.

Figure 19:
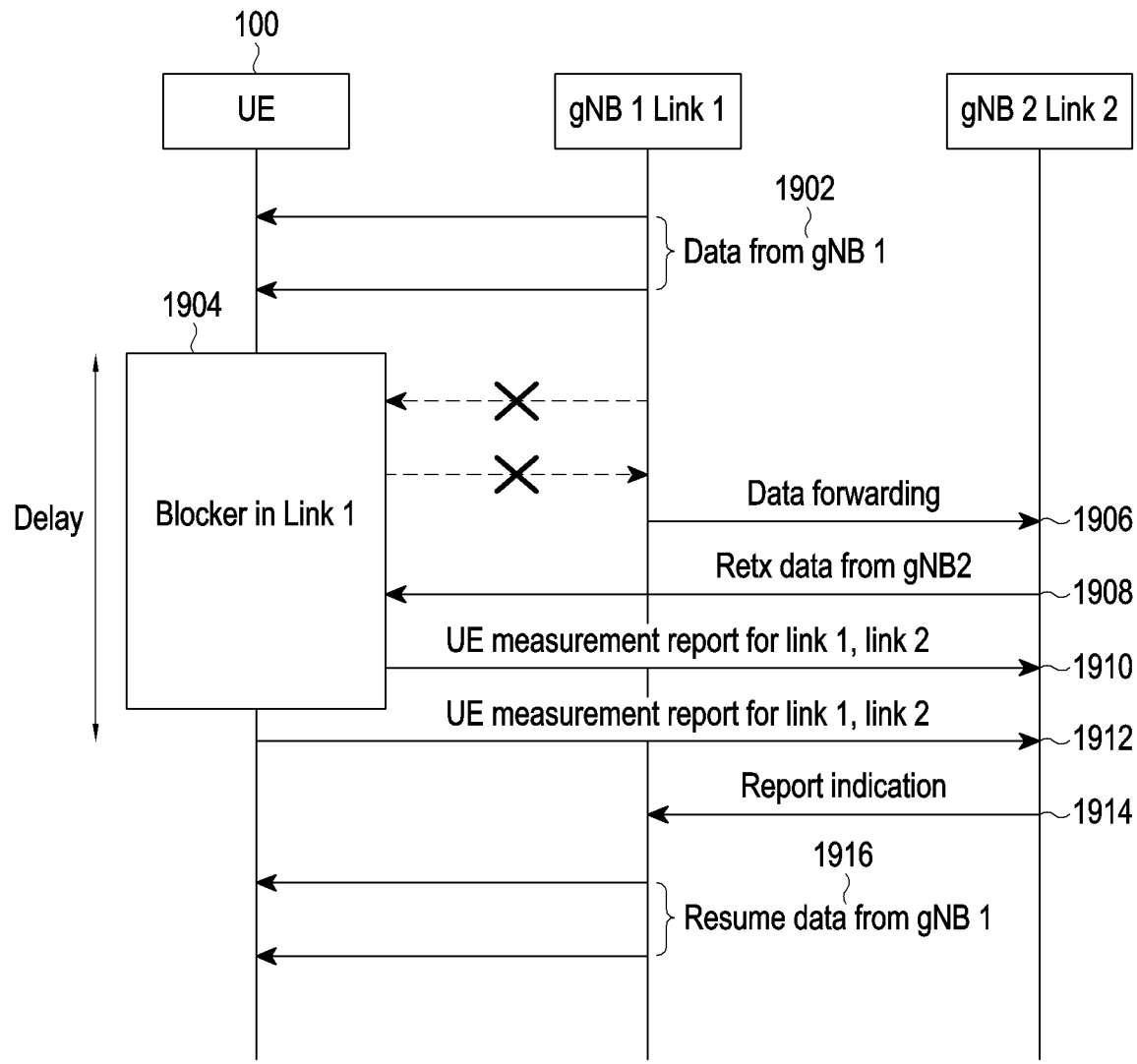
FIG. 19 is a flow diagram for a method of handling a beam blockage in a wireless communication system, according to an embodiment of the present disclosure.

FIG. 19 is a flow diagram illustrating a method for handling a beam blockage in a wireless communication system 1000, according to an embodiment. Referring to FIG. 19, at step 1902, the UE 100 receives data from a gNB1 link 1. Further, at step 1904, the UE 100 detects a blockage in the gNB1 link 1. Further, the UE 100 estimates a duration of the blockage and indicates the blockage to the gNB1 link 1.

At step 1906, the gNB1 link 1 transmits the data to a gNB2 link 2. In response to the data transmission, at step 1908, the UE 100 receives the data from the gNB2 link 2. Further, at step 1910 and step 1912, the UE 100 sends a measurement report for the link 1 and the link 2 to the gNB2 link 2. The gNB2 link 2 sends a report indication to the gNB1 link 1, at step 1914. Accordingly, the gNB1 link 1 resumes data transmission to the UE 100 at step 1916.

The embodiments disclosed herein may be implemented through at least one software program running on at least one hardware device and performing network management functions to control the elements. The elements shown in FIGS. 1 through 19 include blocks which may be at least one of a hardware device, or a combination of a hardware device and a software module.

The foregoing description of the embodiments may so fully reveal the general nature of the embodiments herein that others may, by applying current knowledge, readily modify or adapt for various applications such embodiments without departing from the scope of the present disclosure, and, therefore, such adaptations and modifications are intended to be within the scope of the present disclosure. It is to be understood that the phraseology or terminology employed herein is for the purpose of description and is not intended for limitation. Therefore, while the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A method for handling beam blockage in a wireless communication system, comprising:
   detecting, by a user equipment (UE), a blockage of at least one beam;
   determining, by the UE, a duration of the blockage of the at least one beam, wherein the duration of the blockage is determined at a time at which the blockage is present; and
   indicating, by the UE, the blockage to perform a predetermined process that is selected based on the duration of the blockage, whether the UE is in a connected mode or an idle mode, and whether a beam failure instance counter reaches a beam failure instance maximum count,
   wherein indicating, by the UE, the blockage comprises, in response to a beam failure instance counter not reaching the beam failure instance maximum count:
      determining whether the duration of the blockage is less than a time of a beam failure recovery timer, and
      holding a beam failure recovery procedure and performing a link switch by rerouting a packet to another link for the duration of the blockage when the duration of the blockage is less than the time of the beam failure recovery timer, or
      triggering an early beam failure recovery procedure without waiting for expiry of the beam failure recovery timer and performing the beam switch or the link switch for the duration of the blockage when the duration of the blockage does not meet the time of the beam failure recovery timer.

2. The method of claim 1, wherein indicating, by the UE, the blockage comprises:
   determining whether the UE is in the connected mode or the idle mode;

when the UE is in the idle mode, indicating the blockage to at least one higher layer to hold a cell reselection and perform the cell reselection based on the duration of the blockage; and when the UE is in the connected mode, indicating the blockage to the at least one higher layer to:
  hold at least one ongoing procedure and resume the at least one ongoing procedure based on the duration of the blockage,
  continue the at least one ongoing procedure without incrementing a counter associated with the at least one ongoing procedure during the duration of the blockage, or
  apply a beam switch or a link switch for the duration of the blockage.

3. The method of claim 2, wherein indicating the blockage to the at least one higher layer to hold the cell reselection and perform the cell reselection based on the duration of the blockage comprises:
  determining that all of the at least one beam are blocked;
  determining that the duration of the blockage meets a measurement evaluation criteria of a serving cell;
  determining that the duration of the blockage meets a measurement evaluation criteria for a cell reselection; and
  holding the cell resection and then performing the cell reselection.

4. The method of claim 2, wherein holding the at least one ongoing procedure and then resuming the at least one ongoing procedure based on the duration of the blockage comprises one of:
  holding by stopping an ongoing random access channel (RACH) procedure for the duration of the blockage and resuming the RACH procedure after an offset which is obtained based on the duration of the blockage,
  holding by stopping an ongoing scheduling request (SR) procedure for the duration of the blockage and resuming the SR procedure after an offset obtained based on the duration of the blockage, and
  holding by stopping an ongoing transmission or retransmission procedure for the duration of the blockage and resuming the transmission or retransmission procedure after the duration of the blockage.

5. The method of claim 1, wherein indicating, by the UE, the blockage further comprises:
  in response to the beam failure instance counter reaching the beam failure instance maximum count, indicating the blockage to the at least one higher layer and instructing the at least one higher layer to:
    hold the at least one ongoing procedure and then resume the at least one ongoing procedure based on the duration of the blockage, or
    continue the at least one ongoing procedure without incrementing the counter associated with the at least one ongoing procedure during the duration of the blockage,
  wherein the beam failure instance counter is determined based on the duration of the blockage and a measurement periodicity indicated by a physical layer.

6. The method of claim 5, wherein rerouting the packet to the another link for the duration of the blockage comprises:
  indicating a packet data convergence protocol (PDCP) layer on the duration of the blockage based on a higher layer retransmission timer, and selecting the another link for re-routing the packet based on the duration of the blockage and the higher layer retransmission timer; or
  indicating the PDCP layer on the duration of the blockage based on a PDCP reordering timer, and selecting the another link for re-routing the packet based on the duration of the blockage and the PDCP reordering timer.

7. The method of claim 1, wherein performing the beam switch or the link switch for the duration of the blockage when the duration of the blockage does not meet the time of the beam failure recovery timer comprises:
  performing a beam selection procedure to select at least one candidate beam from a plurality of candidate beams for the early beam failure recovery procedure;
  determining whether all of the plurality of candidate beams are blocked;
  performing the link switch by rerouting the packet to another link for the duration of the blockage when all of the plurality of candidate beams are blocked; and
  performing the beam switch by triggering a random access channel (RACH) procedure on the at least one selected candidate beam when at least one of the plurality of candidate beams is not blocked.

8. The method of claim 1, wherein detecting, by the UE, the blockage of the at least one beam comprises:
  determining a first reference signal received power (RSRP) of the at least one beam or a first signal-to-interference-plus-noise ratio (SINR) of the at least one beam at a first time period;
  determining a second RSRP of the at least one beam or a second SINR of the at least one beam at a second time period;
  determining a difference between the first RSRP and the second RSRP or the first SINR and the second SINR;
  determining whether the difference meets a blockage criteria, wherein the blockage criteria is dynamically measured and configured by the UE; and
  detecting the blockage at the second time period due to the second RSRP or the second SINR of the at least one beam when the difference meets the blockage criteria.

9. The method of claim 1, further comprising:
  indicating, by the UE, a link indication to inform a base station in the wireless communication system to not use the at least one beam for the duration of the blockage,
  wherein the duration of the blockage is determined at the time period based on a median of historic blockage durations of the time period, and
  wherein the link indication is one of a medium access control (MAC) control element (MAC-CE) based indication, a physical uplink control channel (PUCCH) based indication and a physical uplink shared channel (PUSCH) based indication.

10. A user equipment (UE) for handling beam blockage in a wireless communication system, comprising:
  a memory;
  at least one processor; and
  a beam blockage controller, operably coupled to the memory and the at least one processor, configured to:
    detect a blockage of at least one beam;
    determine a duration of the blockage of the at least one beam, wherein the duration of the blockage is determined at a time at which the blockage is present; and
    indicate the blockage to perform a predetermined process that is selected based on the duration of the blockage, whether the UE is in a connected mode or an idle mode, and whether a beam failure instance counter reaches a beam failure instance maximum count, wherein the beam blockage controller is further configured to indicate the blockage to the at least one higher layer to apply the beam switch or the link switch for the duration of the blockage by:
    determining that the beam failure instance counter does not reach the beam failure instance maximum count,
    determining whether the duration of the blockage is less than a beam failure recovery timer, and
    holding a beam failure recovery procedure and performing a link switch by rerouting a packet to another link for the duration of the blockage when the duration of the blockage is less than the beam failure recovery timer, or
    triggering an early beam failure recovery procedure without waiting for expiry of the beam failure recovery timer and performing the beam switch or the link switch for the duration of the blockage when the duration of the blockage exceeds a time of the beam failure recovery timer.

11. The UE of claim 10, wherein the beam blockage controller is further configured to indicate the blockage by:
    determining whether the UE is in the connected mode or the idle mode;
    when the UE is in the idle mode, indicating the blockage to at least one higher layer to hold a cell reselection and then perform the cell reselection based on the duration of the blockage; and
    when the UE is in the connected mode, indicating the blockage to the at least one higher layer to:
        hold at least one ongoing procedure and then resume the at least one ongoing procedure based on the duration of the blockage,
        continue the at least one ongoing procedure without incrementing a counter associated with the at least one ongoing procedure during the duration of the blockage, or
        apply a beam switch or a link switch for the duration of the blockage.

12. The UE of claim 11, wherein the beam blockage controller is further configured to indicate the blockage to the at least one higher layer to hold the cell reselection and perform the cell reselection based on the duration of the blockage by:
    determining that all of the at least one beam are blocked;
    determining that the duration of the blockage meets a measurement evaluation criteria of a serving cell;
    determining that the duration of the blockage meets a measurement evaluation criteria for a cell reselection; and
    holding the cell resection and then performing the cell reselection,
    wherein the beam blockage controller is further configured to indicate the blockage to the at least one higher layer to hold the at least one ongoing procedure and then resume the at least one ongoing procedure based on the duration of the blockage or continue the at least one ongoing procedure without incrementing a counter associated with the at least one procedure during the duration of the blockage by:
        determining that the beam failure instance counter is less than the beam failure instance maximum count; and
        indicating the blockage to the at least one higher layer to:
            hold the at least one ongoing procedure and then resume the at least one ongoing procedure based on the duration of the blockage, or
            continue the at least one ongoing procedure without incrementing the counter associated with the at least one procedure during the duration of the blockage.

13. The UE of claim 12, wherein the beam blockage controller is further configured to hold and resume the at least one procedure based on the duration of the blockage by one of:
    holding by stopping an ongoing random access channel (RACH) procedure for the duration of the blockage and resuming the RACH procedure after an offset which is obtained based on the duration of the blockage,
    holding by stopping an ongoing scheduling request (SR) procedure for the duration of the blockage and resuming the SR procedure after an offset obtained based on the duration of the blockage, and
    holding by stopping an ongoing transmission or retransmission procedure for the duration of the blockage and resuming the transmission or retransmission procedure after the duration of the blockage.

14. The UE of claim 12, wherein the beam blockage controller is further configured to rerouting the packet to the another link for the duration of the blockage by:
    indicating a packet data convergence protocol (PDCP) layer on the duration of the blockage based on the higher layer retransmission timer, and selecting the another link for re-routing the packet based on the duration of the blockage and the higher layer retransmission timer; or
    indicating the PDCP layer on the duration of the blockage based on a PDCP reordering timer, and selecting the another link for re-routing the packet based on the duration of the blockage and the PDCP reordering timer,
    wherein the beam blockage controller is further configured to detect the blockage of the at least one beam by:
        determining a first reference signal received power (RSRP) of the at least one beam or a first signal-to-interference-plus-noise ratio (SINR) of the at least one beam at a first time period;
        determining a second RSRP of the at least one beam or a second SINR of the at least one beam at a second time period;
        determining a difference between the first RSRP and the second RSRP or the first SINR and the second SINR;
        determining whether the difference meets a blockage criteria, wherein the blockage criteria is dynamically measured and configured by the UE; and
        detecting the blockage at the second time period due to the second RSRP or the second SINR of the at least one beam when the difference meets the blockage criteria.

15. The UE of claim 10, wherein the beam blockage controller is further configured to perform the beam switch or the link switch for the duration of the blockage when the duration of the blockage does not meets the beam failure recovery timer by:
    performing a beam selection procedure to select at least one candidate beam from a plurality of candidate beams for the early beam failure recovery procedure;
    determining whether all of the plurality of candidate beams are blocked;
    performing the link switch by rerouting a packet to another link for the duration of the blockage when all of the plurality of candidate beams are blocked; and performing the beam switch by triggering a random access channel (RACH) procedure on the at least one selected candidate beam when at least one of the plurality of candidate beams is not blocked.

16. The UE of claim 15, wherein the beam blockage controller is further configured to select one of the plurality of candidate beams based on a prioritization, wherein the prioritization is based on previous measurement statistics on the plurality of candidate beams, wherein the beam failure instance counter is determined based on the duration of the blockage and a measurement periodicity indicated by a physical layer, and wherein the duration of the blockage is determined at the time period based on a median of historic blockage durations of the time period.

\* \* \* \* \*

UNITED STATES PATENT AND TRADEMARK OFFICE
CERTIFICATE OF CORRECTION

| | |
|---|---|
| PATENT NO. | : 11,438,821 B2 |
| APPLICATION NO. | : 16/507973 |
| DATED | : September 6, 2022 |
| INVENTOR(S) | : Ashok Kumar Reddy Chavva et al. |

It is certified that error appears in the above-identified patent and that said Letters Patent is hereby corrected as shown below:

On the Title Page

--(30) Foreign Application Priority Data
Oct. 26, 2018 (IN) ............. 201841040515--

Should be inserted after:
"(65) Prior Publication Data
US 2020/0137657 A1 April 30, 2020"

Signed and Sealed this
Twenty-second Day of November, 2022

Katherine Kelly Vidal
*Director of the United States Patent and Trademark Office*